United States Patent
Rozas et al.

(10) Patent No.: US 10,552,344 B2
(45) Date of Patent: Feb. 4, 2020

(54) UNBLOCK INSTRUCTION TO REVERSE PAGE BLOCK DURING PAGING

(71) Applicant: Intel Corporation, Santa Clara, CA (US)

(72) Inventors: Carlos V. Rozas, Portland, OR (US); Ittai Anati, Ramat Hasharon (IL); Francis X. McKeen, Portland, OR (US); Krystof Zmudzinski, Forest Grove, OR (US); Ilya Alexandrovich, Yokneam Illit (IL); Somnath Chakrabarti, Portland, OR (US); Dror Caspi, Kiryat Yam (IL); Meltem Ozsoy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 15/854,278

(22) Filed: Dec. 26, 2017

(65) Prior Publication Data

US 2019/0196982 A1    Jun. 27, 2019

(51) Int. Cl.
*G06F 12/14*    (2006.01)
*G06F 12/08*    (2016.01)
(Continued)

(52) U.S. Cl.
CPC ......... *G06F 12/1408* (2013.01); *G06F 3/065* (2013.01); *G06F 3/068* (2013.01);
(Continued)

(58) Field of Classification Search
None
See application file for complete search history.

(56) References Cited

U.S. PATENT DOCUMENTS

| 9,323,686 B2 | 4/2016 | Mckeen et al. |
| 9,690,704 B2 | 6/2017 | Mckeen et al. |

(Continued)

FOREIGN PATENT DOCUMENTS

| WO | 2010/057065 A2 | 5/2010 |
| WO | 2011/078855 A1 | 6/2011 |

OTHER PUBLICATIONS

Intel "Overview of Intel® Software Guard Extensions Instructions and Data Structures," https://software.intel.com/en-us/blogs/2016/06/10/overview-of-intel-software-guard-extensions-instructions-and-data-structures, 6 pages, Jun. 10, 2016, retrieved on Nov. 2, 2017.

(Continued)

*Primary Examiner* — Kaushikkumar M Patel
(74) *Attorney, Agent, or Firm* — Lowenstein Sandler LLP

(57) ABSTRACT

A secure enclave circuit stores an enclave page cache map to track contents of a secure enclave in system memory that stores secure data containing a page having a virtual address. An execution unit is to, in response to a request to evict the page from the secure enclave: block creation of translations of the virtual address; record one or more hardware threads currently accessing the secure data in the secure enclave; send an inter-processor interrupt to one or more cores associated with the one or more hardware threads, to cause the one or more hardware threads to exit the secure enclave and to flush translation lookaside buffers of the one or more cores; and in response to detection of a page fault associated with the virtual address for the page in the secure enclave, unblock the creation of translations of the virtual address.

17 Claims, 27 Drawing Sheets

(51) Int. Cl.
*G06F 12/10* (2016.01)
*G06F 3/06* (2006.01)
*G06F 12/0806* (2016.01)
*G06F 12/0868* (2016.01)
*G06F 12/1009* (2016.01)
*G06F 12/1027* (2016.01)
*G06F 12/128* (2016.01)

(52) U.S. Cl.
CPC ........ *G06F 3/0619* (2013.01); *G06F 12/0806* (2013.01); *G06F 12/0868* (2013.01); *G06F 12/1009* (2013.01); *G06F 12/1027* (2013.01); *G06F 12/128* (2013.01); *G06F 12/145* (2013.01); *G06F 2212/1052* (2013.01); *G06F 2212/621* (2013.01); *G06F 2212/657* (2013.01); *G06F 2212/68* (2013.01)

(56) References Cited

U.S. PATENT DOCUMENTS

| | | |
|---|---|---|
| 2005/0100163 A1 | 5/2005 | Buer |
| 2007/0277223 A1 | 11/2007 | Datta et al. |
| 2011/0307651 A1 | 12/2011 | Wong |
| 2012/0158184 A1 | 6/2012 | Ma et al. |
| 2012/0159184 A1 | 6/2012 | Johnson et al. |
| 2012/0163589 A1 | 6/2012 | Johnson et al. |
| 2014/0297962 A1* | 10/2014 | Rozas ................. G06F 12/0808 711/135 |
| 2015/0186272 A1* | 7/2015 | Goldsmith ............ G06F 12/084 711/130 |
| 2015/0370628 A1* | 12/2015 | Zmudzinski ........ G06F 11/1016 711/133 |
| 2015/0378941 A1* | 12/2015 | Rozas ..................... G06F 13/24 710/267 |
| 2016/0117265 A1* | 4/2016 | McKeen ............. G06F 12/1416 711/102 |
| 2016/0179696 A1* | 6/2016 | Zmudzinski ........ G06F 12/1009 711/163 |

OTHER PUBLICATIONS

Costan, V., et al., "Intel SGX Explained," Computer Science and Artificial Intelligence Laboratory, Massachusetts Institute of Technology, 118 pages, 2016.

International Preliminary Report on Patentability received fro PCT Patent Application No. PCT/US2013/047322, dated Jun. 30, 2015, 7 pages.

International Search Report and Written Opinion received for PCT Patent Application No. PCT/US2013/047322, dated Oct. 16, 2013, 9 pages.

* cited by examiner

| Page Information (UMDSINFO) 700 | | | | |
|---|---|---|---|---|
| Name of Offset | Offset | Size (bytes) | Description | Set by: |
| BITVEC | 0 | 8 | Set of bits passed into EWBE and ELDE. | Software |
| SRCPGE | 8 | 8 | Virtual address of the page where page contents are located. | Software |
| SECS | 16 | 8 | Virtual address of EPC slot that currently contains a copy of the SECS. | Software |

FIG. 7A

| BITVEC 710 | | | | |
|---|---|---|---|---|
| Name of Offset | Offset | Size (bytes) | Description | Set by: |
| B | 0 | 1 | Blocked bit to be used by instructions. | Software |
| RESERVED | 2 | 62 | MBZ | Software |

FIG. 7B

| EVA 800 | | | | | |
|---|---|---|---|---|---|
| Name of Offset | Offset | Size (bytes) | Description | Set by: | Locks |
| Slot_0 | 0 | 64 | UMDS Slot_0 | EWBE/ ELDE instr. | Atomic update to write value of VERSION field. |
| * * * | | | | | |
| Slot_63 | 4031 | 64 | UMDS Slot_63 | EWBE/ ELDE instr. | |

FIG. 8

| UMDS 900 | | |
|---|---|---|
| Name of Offset | Size (bytes) | Description |
| VERSION | 8 | Unique Version |
| LINADDR | 6 | Protect Addr bits 56:12 |
| UMDSFLAGS | 2 | See Table 2 |
| UMDSLock | 1 | Microarchitecture Lock |
| RESERVED | 31 | |
| MAC | 16 | MAC for page and reserved field |

FIG. 9

UNBLOCK INSTRUCTION TO REVERSE PAGE BLOCK DURING PAGING

TECHNICAL FIELD

The disclosure relates to secure paging in and out of a secure enclave of memory, and particularly, to an unblock instruction to reverse a page block during secure paging.

BACKGROUND

Secure paging, also referred to as page swapping, within modern processors utilizes metadata for a page that is to be removed and written back to system memory or disk (e.g., paged out). The metadata is used by a processor for access control and cryptographic operations that protect secure pages. This metadata is to be saved when the page is removed from secure memory. Some of the metadata is kept secret and some of it can be safely exposed, e.g., stored outside of secure memory. Both sets of this metadata, however, are verified when reloading the page from disk. In conventional secure paging, the metadata is split between secure memory and unsecure memory, and thus paging processes also have to track this split in metadata, which complicates both write back operations (to save a page back to disk and save the metadata) and load operations (which restores the page to memory and renews access to the saved metadata). For example, processing logic executing the paging processes should calculate where each field of each set of metadata is (both in the secure and in unsecure memory) and how big each field of each set of metadata is that is to be accessed.

Furthermore, during a write back operation, a series of processor transactions occur that includes saving the metadata, encrypting the page data, and saving the encrypted page to memory and to disk. To restore the page, in most implementations, the processor copies external metadata and the encrypted page into secure memory. The processor performs an authenticated decryption operation that authenticates both the metadata and the page, and verifies either the encrypted contents or the decrypted contents. This series of processor transactions, which include the write back and load operations, is expensive in terms of processing resources and clock cycles.

BRIEF DESCRIPTION OF THE DRAWINGS

FIG. 7A is a diagram of a unified metadata structure information (UMDSINFO) data structure, according to implementations.

FIG. 7B is a diagram of a data vector that is a part of the UMDSINFO data structure, according to implementations.

FIG. 8 is a diagram of an extended version array page, according to implementations.

FIG. 9 is a diagram of a unified metadata structure (UMDS), according to implementations.

DETAILED DESCRIPTION

Figure 1A:
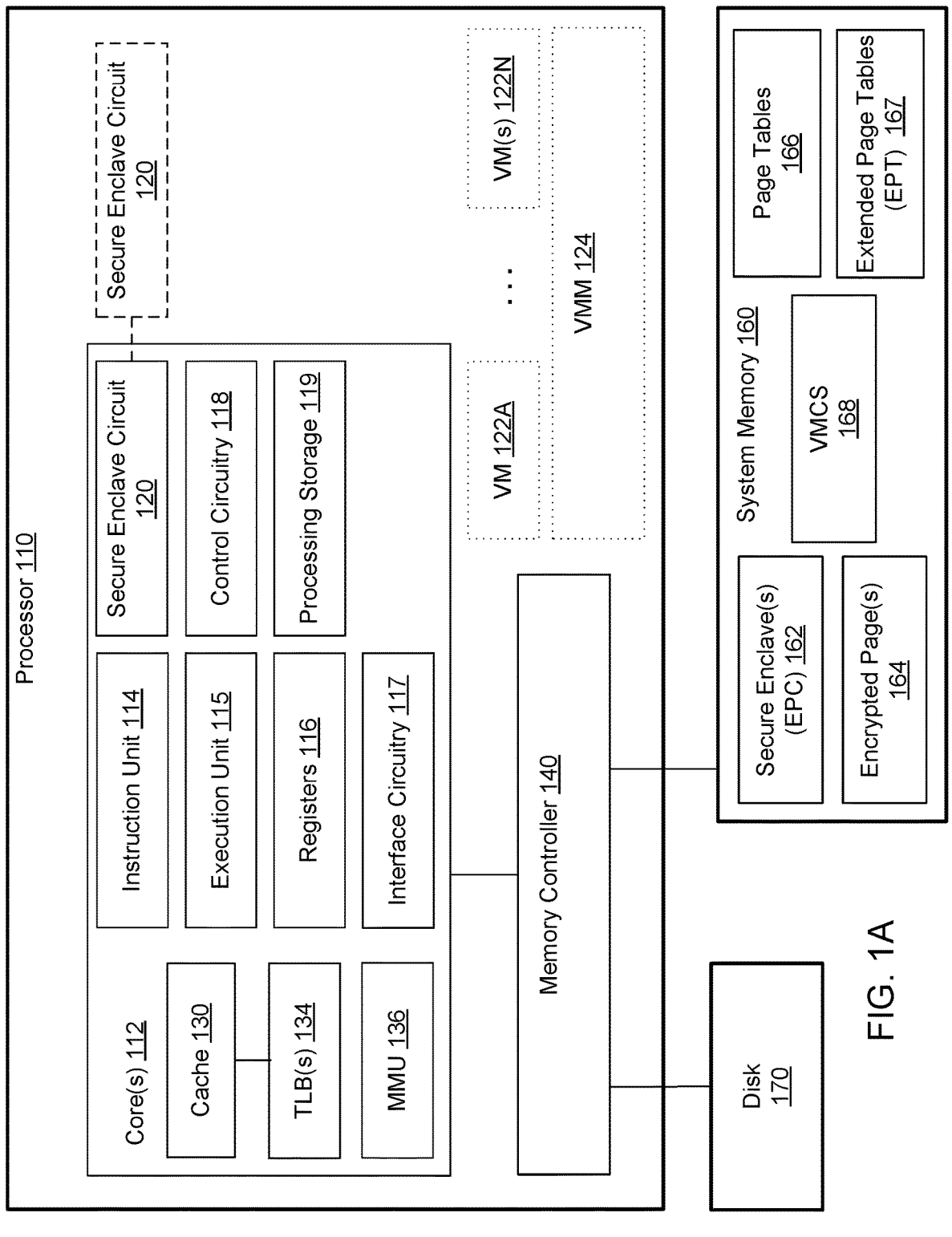
FIG. 1A is a block diagram of exemplary system that performs enhanced secure paging, according to various implementations.

Implementations of the disclosure describe an unblock instruction to reverse a page block during secure paging. In one implementation, after a page in secure memory has been idle for a period of time (e.g., not accessed), processing logic (e.g., within a processing core) may perform certain operations in preparation to remove the page from the secure memory and write it back to disk (e.g., be paged out). Secure memory is protected memory and may be referred herein to as enclave page cache (EPC), a secure enclave, or "enclave." The pages within the enclave may be referred to as EPC pages. An enclave may delineate certain address ranges of system memory as being secure, and thus interaction with that address range is by way of secure instructions (also called Software Guard Instructions or SGX by Intel® Corporation of Santa Clara, Calif.). When a page is paged out, metadata associated with the page is saved for later use (after the page is restored to secure memory) and that encrypted data for the page is saved back to regular system memory (outside of the secure enclave) or on a disk (e.g., hard disk drive (HDD), solid-state drive (SSD), or other permanent storage). The processing logic may execute an enclave write back instruction (e.g., EWB instruction) to encrypt the data, write the encrypted data to system memory (outside of the secure enclave), and to also write the encrypted data back to disk.

In preparation for the EWB instruction execution, the processing logic may first block further translations of the virtual address for access to the page, e.g., by executing an enclave block instruction (e.g., EBLOCK instruction). For example, the processing logic may mark the page (e.g., a virtual address for the page) as not present in translation tables and extended translation tables, detect passage of a period of time during which the page is not accessed, and set a "block" bit in an enclave page cache map (EPCM) for the EPC page mapped to the virtual address to block creation of the further translations of the virtual address. The processing logic may also record one or more hardware threads currently accessing the secure data in the secure enclave (e.g., execute an ETRACK instruction), and send an inter-processor interrupt (IPI) to one or more cores associated with the one or more hardware threads, to cause the one or more hardware threads to exit the secure enclave and flush translation lookaside buffers (TLBs) of the one or more cores.

After this series of preparations to perform the EWB instruction, it is possible that the processing logic detects a page fault, indicating a system agent or an application component has attempted access of the page in the enclave. But, because the page has been blocked and entries in the TLBs flushed, there can be no access to the page. Conventionally, in response to detection of a page fault associated with the virtual address for the page in the secure enclave, the processing logic would proceed with execution of the EWB instruction, optionally write the encrypted data to disk, optionally read the encrypted data from disk, and execute an enclave load instruction (e.g., ELD instruction) to restore the page to the secure memory. However, this incurs significant overhead, consuming many processing resources, thus degrading performance of secure memory operation in cases where a page fault is detected before an EWB instruction is executed. The disclosed implementations herein provide ways in which to unblock the creation of the further translation of the virtual address to proceed with page access without executing the EWB and ELD instructions.

For example, the processing logic may execute an enclave unblock instruction (e.g., EUNBLOCK instruction) to clear the bit in the EPCM for the virtual address, and mark the page as present in the translation tables. This may set architectural states for new translation entries in the TLBs, and renewed access to the data stored at the virtual page address in the secure memory. Execution of the EUNBLOCK instruction may significantly reduce processor clock cycles used to execute the instruction when compared to the previous approach in which the EWB instruction is executed to perform a write back followed by an ELD instruction to restore the page from system memory (or disk) to the secure memory.

In some implementations, the page fault is received after the start of EWB instruction execution, in which case the EWB and ELD instructions are to complete in order to restore access to the page. In conventional secure paging, the metadata associated with a page is split between secure memory and unsecure memory, and thus paging processes like EWB and ELD instructions also have to track this split in metadata, which complicates both write back operations (to save a page back to disk and save the metadata) and load operations (which restores the page to memory and renews access to the saved metadata). For example, processing logic executing the paging processes should calculate where each field of each set of metadata is (both in the secure and in unsecure memory) and how big each field of each set of metadata is that is to be accessed.

The disclosed implementations may employ a unified metadata structure (UMDS) to store all the metadata related to an EPC page, including the version and message authentication code (MAC) values, which are discussed in more detail below. The UMDS may be stored within a slot of an extended version array (EVA) page of the secure memory. The EVA page may be stored at a particular address in secure memory, so that the metadata does not have to be stored to or retrieved from multiple locations, one within the secure memory and one outside of secure memory. In this way, the execution of the EWB and ELD instructions are streamlined, obviating the need to access multiple address locations with flexible amounts of metadata, but with a single access to a slot within the EVA page that stores the UMDS.

As a further advantage of the disclosed UMDS-based architecture, a virtual machine monitor (VMM) (e.g., hypervisor) may execute the EBLOCK instruction to generate a block state bit, to indicate a blocked state of a page to be paged out of the secure memory. This block state bit may trigger passage of the blocked bit set in the EPCM (discussed above) to a UMDS information (UMDSINFO) data structure or within the UMDS itself, both of which are discussed in more detail below. Insertion of the blocked bit into a UMDS-related structure may allow the EWB and the ELD instructions to reference the blocked bit in order to track, during secure paging, the blocked status of the page (e.g., whether the page is in a BLOCKED state or not). This may allow a secure load operation to restore the blocked bit to the EPCM in the proper state in addition to other load-related operations in loading the page back into the enclave. These and other operations related to use of the UMDS architecture streamline the secure paging architecture, thus reducing overhead and complexity. As just one example, the ELD extended (e.g., ELDE) instruction may now be a single instruction in contrast with conventional systems where a different ELD instruction was to be executed depending on whether the page had been blocked (ELDB) or unblocked (ELDU).

FIG. 1A is a block diagram of exemplary system 100 that performs enhanced secure paging, according to various implementations. The system 100 includes a processor 110, system memory 160, and disk 170. The processor 110 may include, but not be limited to, multiple cores 112, a memory controller 140, and a secure enclave circuit 120 optionally positioned within or outside the cores 112 of the processor 110. The processor 110, e.g., by way of at least one of the multiple cores 112, may execute a virtual machine monitor (VMM) 124, which may be used to create, control, and manage multiple virtual machines 122A . . . 122N. The memory controller 140 may be used to interface with and control saving data to and retrieving data from the computer storage 170 and the system memory 160.

The system 100 may represent a type of information processing system, such as a server, a desktop computer, a portable computer, a set-top box, a hand-held device, or an embedded control system. Systems embodying the present implementations may include any number of each of these components and any other components or other elements, such as information storage devices, peripherals, and input/output devices. Any or all of the components or other elements in this or any system embodiment, may be connected, coupled, or otherwise in communication with each other through any number of buses, point-to-point, or other wired or wireless interfaces or connections, unless specified otherwise.

The processor 110 may represent one or more processors integrated on a single substrate or packaged within a single package, each of which may include multiple threads and/or multiple execution cores, in any combination. Each processor represented as processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller.

The system memory 160 may be dynamic random access memory (DRAM) or other type of medium readable by the processor 110. The system memory 160 may include, but not be limited to multiple secure enclaves 162, which is also referred to herein as enclave page cache (EPC), encrypted pages 164 stored outside of the secure enclaves 162, page tables 166 and extended page tables (EPT) 167 used to perform address translations, and a virtual machine control structure (VMCS) 168. The VMCS 168 may contain pointers to the page tables 166 and EPT 167, and may be created for interaction with and control of one of the virtual machines 122A . . . 122N. The disk 170 may include any type of persistent or non-volatile memory or storage, such as a flash memory and/or HDD, SSD, magnetic, or optical disk drive.

The processor 110 may further include an instruction unit 114, an execution unit 115, multiple registers 116, interface circuitry 117, control circuitry 118, a processing storage 119, the secure enclave circuit 120, cache 130, translation lookaside buffers (TLBs) 134, and memory management unit (MMU) 136. The instruction unit 114 may represent circuitry, structure, or other hardware, such as an instruction decoder, for fetching, receiving, decoding, and/or scheduling instructions. Any instruction format may be used within the scope of the disclosed implementations; for example, an instruction may include an opcode and one or more operands, where the opcode may be decoded into one or more micro-instructions or micro-operations for execution by execution unit 115. The execution unit 112 may include circuitry, structure, or other hardware, such as an arithmetic unit, logic unit, floating point unit, shifter, etc., for processing data and executing instructions, micro-instructions, and/or micro-operations.

The processing storage 119 may represent a type of storage usable for a local purpose within the processor 110; for example, the processing storage 119 may include flash memory, static random access memory (SRAM), or other volatile memory or fast-access storage structures. The registers 116 may provide additional local storage for use by architectural instructions, including the disclosed secure instructions, such as general purpose registers (GPRs), special purpose registers (SPRs), and segment registers, used in the instruction set architecture (ISA) in the Intel® Core® Processor Family or other processor family from Intel® Corporation. The registers 116 may further be data registers, instruction registers, status registers, configuration registers, control registers, or other programmable or hard-coded registers or register files.

The interface circuitry 117 may include hardware or other structures, such as a bus, messaging circuitry, or other circuitry, port, or interface, to allow the processor 110 to communicate with other components in system 100 through any type of bus, point to point, or other connection, directly or through any other component, such as a memory controller or a bus bridge.

The control circuitry 117 may include logic, microcode, circuitry, or other hardware to control the operation of the units and other elements of the processor 110 and the transfer of data within, into, and out of the processor 110. The control circuitry 117 may cause the processor 110 to perform or participate in the performance of methods or processes related to the disclosed implementations, for example, by causing the processor 110 to execute instructions received by instruction unit 114 and micro-instructions or micro-operations derived from instructions received by instruction unit 114.

The cache 130 may represent any one or more levels of cache memory (e.g., L1, L2, L3, LLC . . . ) in a memory hierarchy of information processing system 100, implemented in static random access memory or any other memory technology. The cache 130 may include any combination of cache memories dedicated to or shared among any one or more of the cores 112 within the processor 110 according to various caching techniques. For example, some of the cache may be for data and other cache may be instructions.

The TLBs 134 may likewise exist within multiple layers of TLBs and may contain some TLBs for instructions and separate TLBs for data. The TLBs 134 may cache address translations for virtual addresses of pages that are resident in the secure enclave(s) 162. The ability to cache address translations, as will become evident, saves significant processing resources required to repeatedly translate any given virtual address.

The secure enclave circuit 120 may represent logic, circuitry, hardware, or other structures for creating and maintaining a secured, protected, or isolated environment, such as a secure enclave as described herein, in which an application or other software may run, execute, be loaded, or otherwise be present within an information processing system such as system 100. For purposes of this description, each instance of such an environment may be referred to as a secure enclave, although disclosed implementations are not limited to those using a secure enclave as the secured, protected, or isolated environment. In one embodiment, a secure enclave may be created and maintained using instructions in the ISA of a processor. The secure enclave circuit 120 will be discussed in detail with reference to FIG. 3. The processor 110 may also include other circuitry, structures, or logic not shown in FIG. 1, and/or circuitry, structures, or logic shown or described as elsewhere in the figures.

Figure 1B:
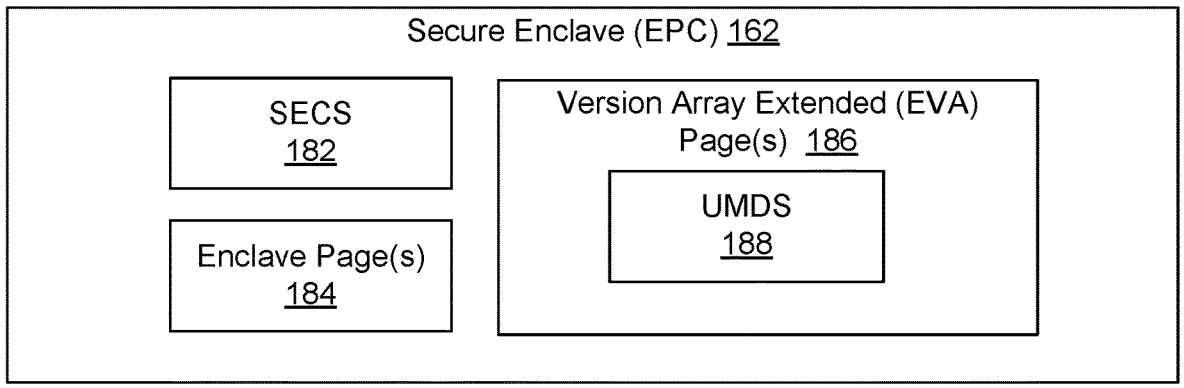
FIG. 1B is a block diagram of an example secure enclave within system memory of the system of FIG. 1A, which includes use of a unified metadata structure (UMDS) according to implementations.

FIG. 1B is a block diagram of an example secure enclave 162 within the system memory 160 of the system of FIG. 1A, according to one implementation. The secure enclave 162 may include, but not be limited to, a secure enclave control structure (SECS) 182 and enclave page(s) 184, also referred to EPC page(s) 184. The secure enclave 162 may further include at least one extended version array page (EVA) 186 to store multiple UMDSs 188, each UMDS 188 being associated with a page of secure memory. The SECS 182 identifies and defines the enclave, e.g., with an enclave ID (EID) generated upon creation of the enclave upon execution of an enclave create instruction (e.g., ECREATE instruction). Each sub-EPC page associated with the enclave can include a back-pointer to the SECS 182 to be identified with the enclave. The EVA page 186 may be created with a list of slots, each slot to store the UMDS 188 of a page involved with paging. The EVA page 186 may be paged out as well (e.g., when filled), as long as the EVA page 186 remains logically linked to one remaining parent EVA page 186 in the secure memory. The structures of the secure enclave (EPC) 162 and their role in the disclosed UMDS-based architecture will be explained in more detail.

Figure 2:
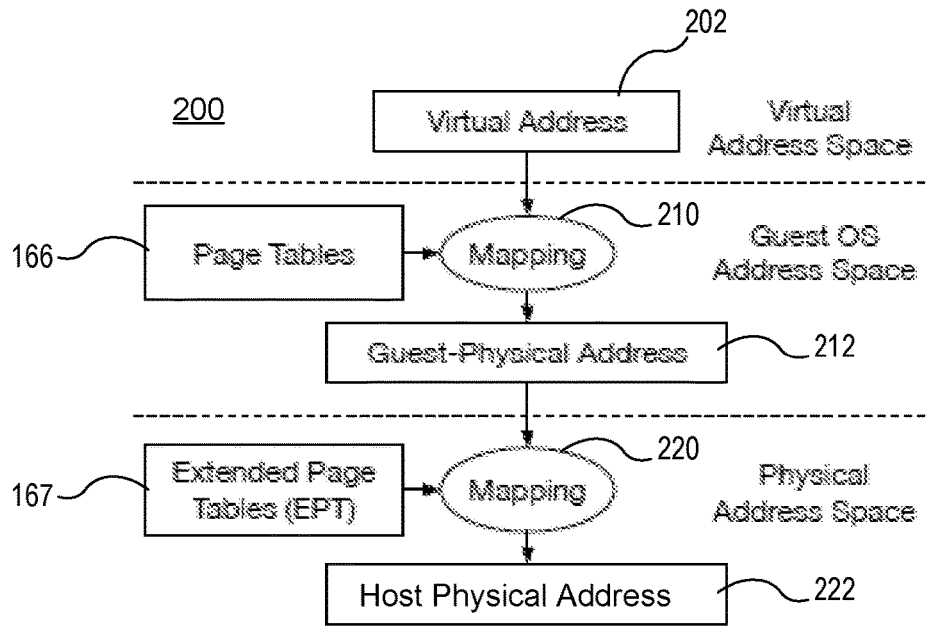
FIG. 2 is block diagram of a method for translating virtual addresses for a page ultimately into a host physical address, according to implementations.

FIG. 2 is block diagram of a method 200 for translating a virtual address 202 for a page ultimately into a host physical address 222, according to disclosed implementations. From a systems perspective, address translation is a layer of indirection between the virtual addresses, which are used by a program's memory load and by store instructions, and the physical addresses, which reference the physical address space of the system memory 160. The mapping between virtual and physical addresses is defined by page tables, which are managed by the system software.

Operating systems use address translation to implement virtual memory abstraction. The virtual memory abstraction exposes the same interface as the memory abstraction in ISA, but each process may use a separate virtual address space that only references the memory allocated to that process. From an application developer standpoint, virtual memory can be modeled by assuming that each process runs on a separate computer and has its own DRAM.

Address translation may be used by the operating system to multiplex DRAM among multiple application processes, isolate the processes from each other, and prevent application code from accessing memory-mapped devices directly. The latter two protection measures prevent an application's bugs from impacting other applications or the OS kernel itself. The VMM 124 may use address translation to divide the DRAM among operating systems that run concurrently, and to virtualize memory-mapped devices.

The system 100 may take advantage of hardware virtualization with use of the VMM 124 (e.g., hypervisor) to run multiple guest operating systems at the same time. This creates some tension, because each guest operating system was written under the assumption that it owns the entire computer's system memory (e.g., DRAM). The tension may be solved by a second layer of address translation, illustrated in FIG. 2.

When the VMM 124 is active, the page tables 166 set up by an operating system map provide a first mapping 210 between virtual addresses 202 and guest-physical addresses (GPAs) 212 in a guest-physical address space. The VMM 124 multiplexes the computer's DRAM between the operating systems' guest-physical address spaces via the second layer of address translations, which uses the EPT 167 to map, using a second mapping 220, guest-physical addresses (GPAs) 212 to host physical addresses (HPAs) 222.

The EPT 167 may use the same data structure as the page tables 166, so the process of translating guest-physical addresses to physical addresses follows the same steps as IA-32e address translation. The main difference is that the physical address of the data structure's root node is stored in an extended page table pointer (EPTP) field in the VMCS 168 for the guest OS. As mentioned, once translations are created for a page, which the VMM 124 may perform in advance, the GPA 212 and the HPA 222 may each be stored in a TLB 134 associated with each core 112 that has accessed the page within the shared secure enclave 162. The caching of the GPA 212 and HPA 222 within the TLB 134 may prevent the need to continually retranslate the virtual address for repeated access to instructions or data located at the HPA 222.

Figure 3:
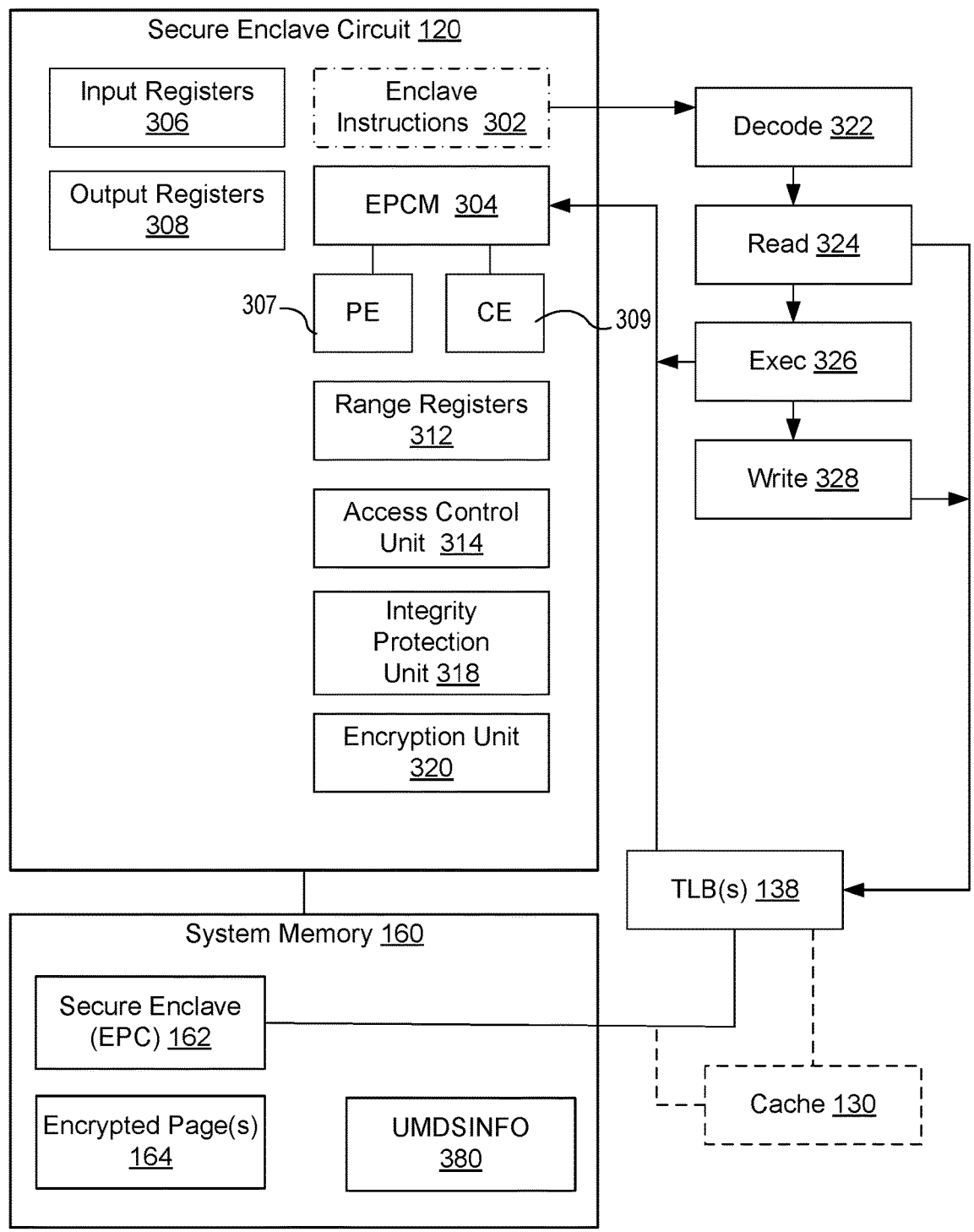
FIG. 3 is a block diagram of a secure enclave circuit of the processor of FIG. 1A, according to implementations.

FIG. 3 is a block diagram of a secure enclave circuit 120 of the processor 110 of FIG. 1A, according to implementations. The secure enclave circuit 120 may reside within the core 112 or outside of the core 112, as shown in FIG. 1. The secure enclave circuit 120 may provide advanced paging capabilities for a secure enclave page cache (EPC) 162, which is generally stored in the system memory 160. In various alternative implementations, the EPC 162 may extend to one or more distributed structures shared by multiple hardware threads, logical processors or processing cores, to store secure data for an address of a shared EPC page allocated to a secure enclave and accessible by the hardware threads, logical processors or processing cores. For example, the EPC 162 may extend to the cache 130 (or similar storage) of one or more cores 112 of the processor 110 (indicated with the dashed lines). Because the EPC page is a memory page, the EPC page may be evicted from the cache. Due to an ever-increasing availability of system memory and that the EPC 162 may be flexibly convertible within processor reserved memory ranges, modern processors may refrain from caching secure data in on-chip EPCs, although this option is still within the scope of the disclosed implementations.

The secure enclave circuit 120 may perform operations in response to a number of enclave instructions 302 (indicated in dashed lines), some of which have already been mentioned. The enclave instructions 302 may include, but are not limited to, enclave block (EBLOCK), enclave unblock (EUNBLOCK), enclave track (ETRACK), enclave make extended version array (EMKEVA), enclave write back (EWB), enclave load (ELD), enclave exit (EEXIT), enclave enter (EENTER), and other enclave instructions, not shown (e.g. AEX instruction, ERESUME instruction, etc.) Furthermore, the ELD instruction may be referred as an ELD extended (ELDE) instruction and the EWB instruction may be referred to as an EWB extended (EWBE) instruction when performed with use of UMDS-related structures, as will be described in detail below.

The system memory 160 may further store UMDS information data structure (UMDSINFO) 380, which may also be referred to, more generally, as an information data structure. The UMDSINFO 380 may store parameters, addresses, and a blocked bit associated with employment of the UMDS 188 within select enclave instructions 302, such as the ELDE and the RWBE. The UMDSINFO 380 will be explained in additional detail with reference to at least FIGS. 7A and 7B.

The secure enclave circuit 120 may further include an enclave page cache map (EPCM) 304, input registers 306, output registers 308, two or more epoch counter storage locations, including a previous epoch counter (PE) 307, a current epoch counter (CE) 309, multiple range registers 312, an access control unit 314, and an integrity protection unit 318. The input registers 306 and the output registers 308 may be GPRs or other type of register. The input registers 306 may provide a virtual address of a page (e.g., in the RCX), an address of a version array slot (e.g., in the RDX), the address of the UMDSINFO 380 (e.g., in the RBX), and others as are specified, although the particular register can be assigned differently than disclosed. The output registers 308 may be used primarily to output error codes or statuses with reference to execution of aspects of the enclave instructions. The range registers 312 may specify, to system software (such as the OS or VMM), ranges of reserved memory that may be converted to and used as the EPC 162, which may thus flexibly grow within the system memory 160 depending on demand by applications that call for use of the enclave instructions 302.

The EPCM 304 is a secure structure used by the processor 110 to track contents of the EPC 162. The EPCM 304 may hold an entry for each page that is currently loaded into the EPC 162, is not accessible by software, and the layout of the EPCM fields may be implementation specific. One of the fields of the EPCM may store a blocked bit to indicate whether any given page has been blocked by the EBLOCK instruction. As the page is paged in and out of the EPC 162, a current epoch counter may supply a value, which may be stored in the CE 309 storage location. After a further clock cycle, the value stored for a particular epoch in the CE 309 may be moved to the PE 307 storage location.

The processor core 112 also includes the TLB(s) 138 in which translations may be buffered to provide access to particular pages within the EPC 162. The processor core 110 may also include a decode stage 322, a read stage 324, one or more execution units (e.g., execution unit 326), and a write stage 328. Implementations of the processor core 110 may also comprise other pipeline stages (e.g., as shown in pipeline 1601 of FIG. 16B) for execution of enclave instructions 302 to provide advanced paging capabilities for secure enclave page cache, EPC 162.

In one implementation, the EBLOCK instruction specifies a shared page address as an operand. One or more execution units (e.g., execution unit 326) mark an entry corresponding to an enclave page cache mapping in EPCM 304 for the address of the shared page in order to block creation of a new TLB translation e.g., in TLB 138 or in any other TLB) for hardware threads, logical processors or processing cores to access the shared page. In one implementation, the ETRACK instruction specifies the secure enclave 162 as an operand, and one or more execution units execution unit 326, or access control unit 314) record the hardware threads currently accessing secure data in the EPC 162 corresponding to the secure enclave. For example, in one implementation, the enclave may maintain two or more epoch counters (e.g., in PE 307 and in CE 309) to record a number of hardware threads currently accessing secure data in the current epoch of the secure enclave (e.g., in CE 309). The enclave may then copy that number to a most recent previous epoch counter (e.g., in PE 307) and initialize a new epoch with no hardware threads as the current epoch (e.g., in CE 309).

The system software (e.g., OS, VMM) may then send an inter-processor interrupt (IPI) to any hardware threads, logical processors, or processing cores, currently accessing secure data in the EPC 162 corresponding to the secure enclave. Each hardware thread, logical processor or processing core, currently accessing secure data corresponding to the secure enclave would have entered the secure enclave with an EENTER (or ERESUME) instruction specifying the secure enclave, and at that time an epoch number would have been associated with the hardware thread, logical processor, or processing core. When the hardware threads, logical processors, or processing cores acknowledge the inter-processor interrupt (IPI) and exit the secure enclave, their TLB translation or translations are flushed (e.g., from TLB 138 or other TLB associated with respective thread, logical processor, or processing core). Whenever hardware threads from the most recent previous epoch exit the secure enclave with an EEXIT (or AEX) instruction, the recorded number of hardware threads in the most recent previous epoch counter (e.g., in PE 307) is decremented.

When the recorded number of hardware threads (e.g., in PE 307) reaches zero ("0"), it is considered safe for the system software to evict the page, encrypt the data, and write the encrypted page back to memory or non-volatile storage. In one implementation, the system software may execute the EWB instruction specifying the address of the shared page as an operand, to complete the eviction, encrypt the secured data and write the page to non-volatile storage. Since enclave protection of the secure data may not be able to trust the system software, one implementation of the EWB instruction may fail if the recorded number of hardware threads from the most recent previous epoch (e.g., in PE 307) has not reached zero. In other alternative implementations, the EWB instruction may wait until the recorded number of hardware threads (e.g., in PE 307) reaches zero to execute, or the EWB instruction 1533 may cause an exception.

While permissions, physical memory and/or changing mappings can be managed by the system software, when the memory contents are protected, as in a secure enclave, the system software may not be permitted or trusted to access the actual protected contents of the enclave private memory. A staged approach may be employed to guarantee the security and/or integrity of private memory contents and manage the technical constraints of limited amount physical memory (e.g., EPC 162) to support a larger, protected enclave private memory space, without being able to trust system software. For example, the disclosed implementations employ instructions and processing logic to provide advanced paging capabilities for secure enclave page caches, without requiring elaborate hardware support and/or design effort.

Figure 4:
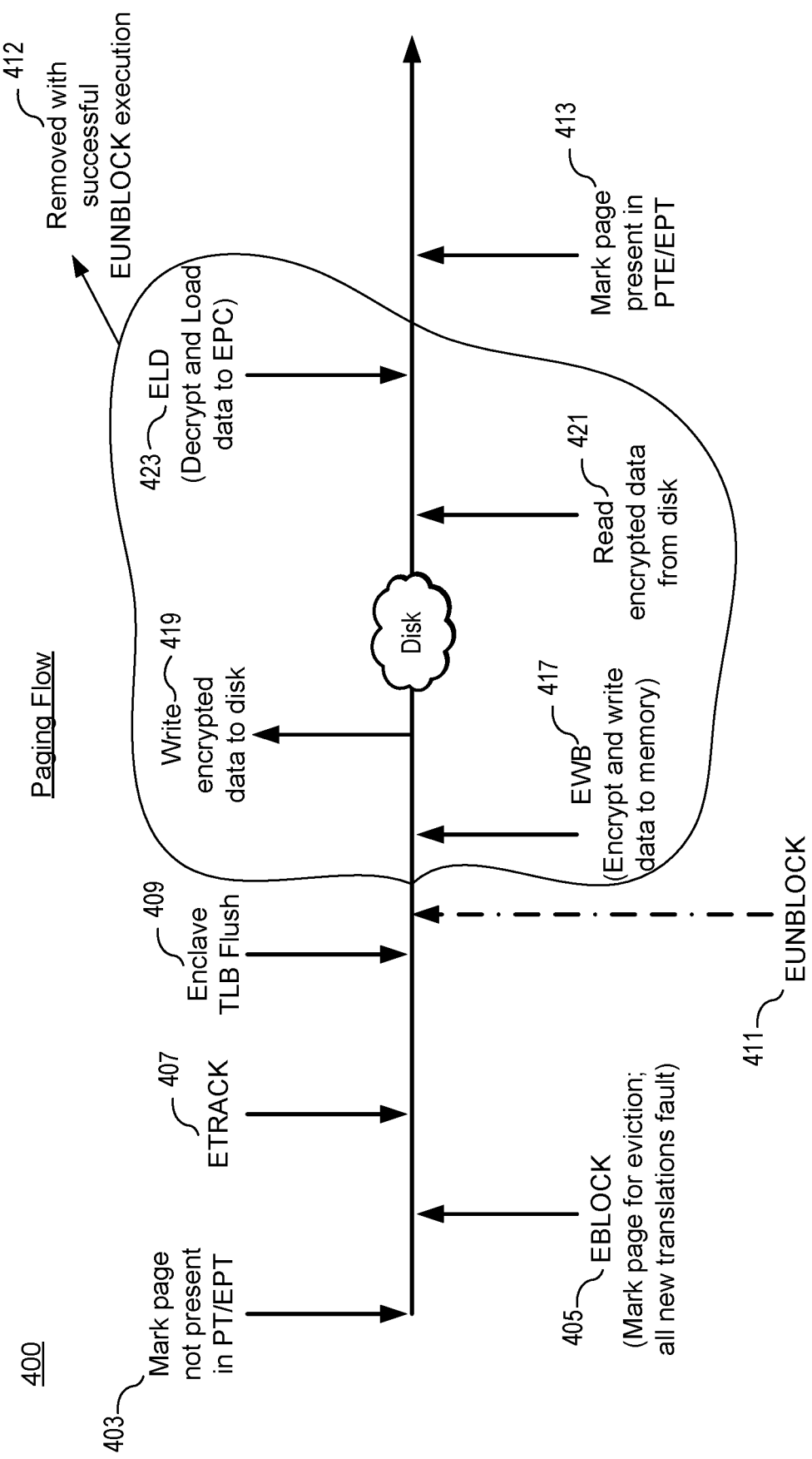
FIG. 4 is a flow chart of a method for a paging flow of a page in and out of secure memory, according to implementations.

FIG. 4 is a flow chart of a method 400 for a paging flow of a page in and out of secure memory, according to implementations. The method 400 describes, in abbreviated fashion, the paging flow of a page (being paged out and then back into secure memory) as described in some detail with respect to FIG. 3, and how the paging flow is impacted by execution of the UNBLOCK instruction. The method 400 may be performed by processing logic that may include hardware (e.g., circuitry, dedicated logic, and/or programmable logic), software (e.g., instructions executable on a computer system to perform hardware simulation), or a combination thereof. In an illustrative example, the method 400 may be performed by the processor 110 of the system 100 of FIGS. 1-3, including by the secure enclave circuit 120.

The method 400 may begin with processing logic marking the page as not present in the page tables 166 and EPT 167 (403). The method 400 may continue with the processing logic executing an EBLOCK instruction to mark the page for eviction, such that all new translations should fault (405). Execution of the EBLOCK instruction may cause the processing logic to detect passage of a period of time during which the page is not accessed and set a bit in the enclave page cache map for the virtual address to block creation of further translations of the virtual address for access to the page. The method 400 may continue with the processing logic executing an ETRACK instruction to track the epoch counters and identify any hardware thread, logical processor, or processing core that had access to the page has exited the secure memory (407). As discussed, as part of execution of the ETRACK instruction, the processing logic may send an IPI to core(s) associated with the hardware threads having access to the page, which may cause the hardware threads to exit the secure enclave and the core(s) to flush their TLBs (409).

After the processing logic has executed the secure instructions and caused the TLB flush, the processing logic may, in some cases, detect a page fault of the page indicative of an attempted access of the page by a system agent. The disclosed implementations provide for execution of a new EUNBLOCK instruction, e.g., in response to detection of the page fault (411). The EUNBLOCK instruction may unblock the creation of further translations of the virtual address for the page. For example, to do so, the processing logic may clear the bit in the enclave page cache map for the virtual address and mark the page as present in the plurality of translation tables. Additional steps may be employed in executing the EUNBLOCK instruction as discussed in more detail with reference to FIGS. 5, 6A, and 6B. Advantageously, the processing logic may then skip past steps 417, 419, 421, and 423, e.g., which are removed with a successful completion of the UNBLOCK instruction for the page (412). The method 400 may continue with the processing logic marking the page again as being present in the page tables 166 and the EPT 167 (413).

If, however, there is no page fault detected before the processing logic executes the EWB instruction, the method 400 may continue with the processing logic completing execution of the EWB instruction to encrypt the data for the page and write the encrypted data to memory (417). The method 400, under these circumstances, may continue with the processing logic writing the encrypted data to disk (419). The method 400 may continue with the processing logic reading the encrypted data from the disk (421). The method 400 may continue with the processing logic decrypting the encrypted data and loading the decrypted data into a free slot of the EPC 162 of the secure memory (423). If, during processing the steps designated as 412, the processing logic detects a page fault, the processor 110 may still need to complete execution of the rest of the steps designated as 412 to get the page restored to the secure enclave.

Figure 5:
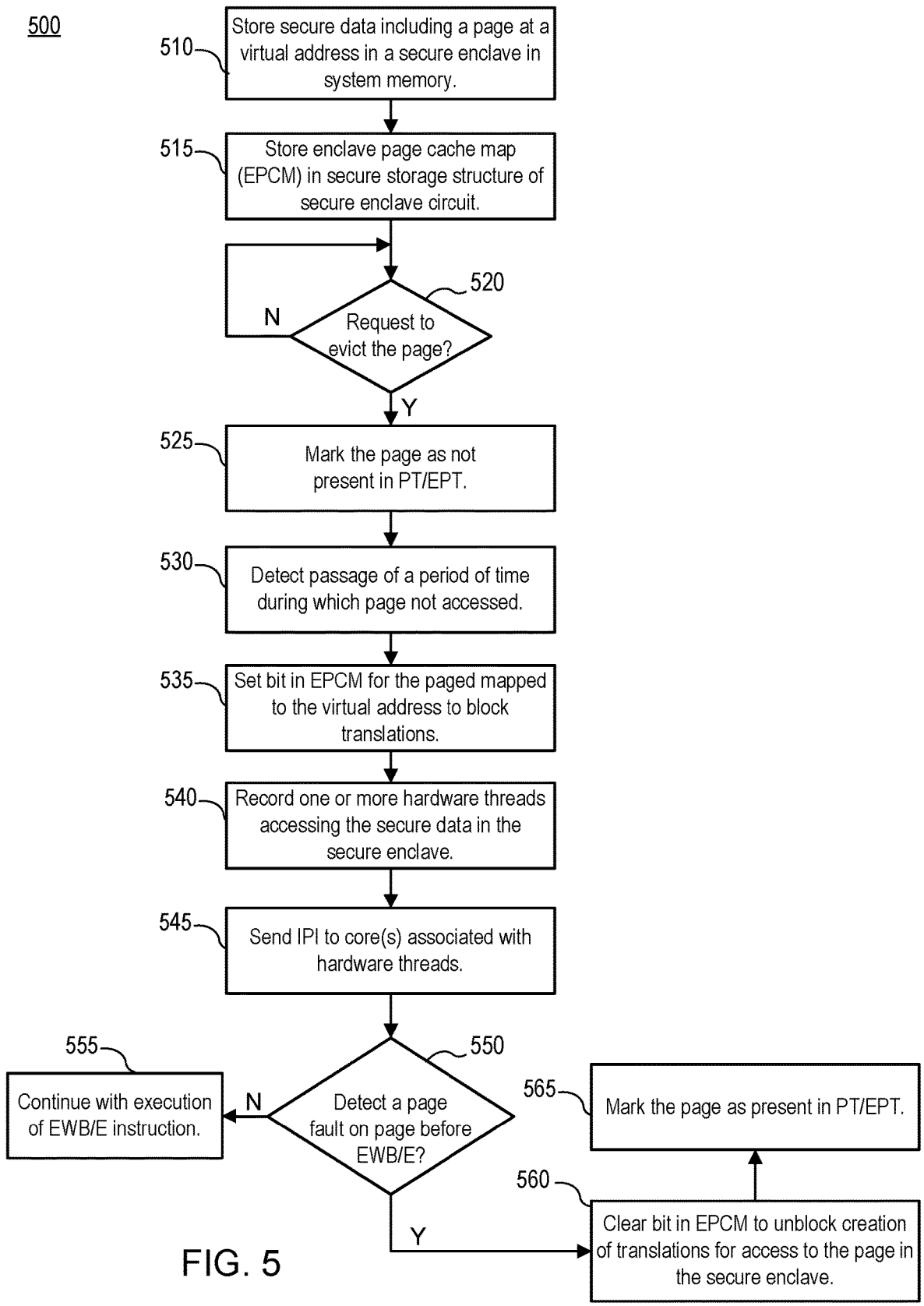
FIG. 5 is a flow chart of a method for unblocking creation of further translations of a page after receipt of a page fault associated with the page, according to implementations.

FIG. 5 is a flow chart of a method 500 for unblocking creation of further translations of a page after receipt of a page fault associated with the page, according to implementations. The method 500 may be performed by processing logic that may include hardware (e.g., circuitry, dedicated logic, and/or programmable logic), software (e.g., instructions executable on a computer system to perform hardware simulation), or a combination thereof. In an illustrative example, the method 500 may be performed by the processor 110 of the system 100 of FIGS. 1-3, including by the secure enclave circuit 120.

The method 500 may begin with the processing logic storing secure data including a page at a virtual address in a secure enclave in system memory (510). The method 500 may continue with the processing logic storing the EPCM 304 for the enclave in a secure storage structure of the secure enclave circuit 120 (515). The method 500 may continue with the processing logic determining whether a request to evict the page from the secure memory has been received (520). If not received, the processing logic may wait (520). If received, the method 500 may continue with the processing logic marking the page as not present in the page tables and extended page tables (525). The method 500 may continue with the processing logic detecting the passage of time during which the page is not accessed (530). The method 500 may continue with the processing logic setting a hit in the enclave page cache map for the page mapped to the virtual address to block creation of translations of the virtual address for access to the page, e.g., as the page is to be removed from the secure enclave (535).

In various implementations, the method 500 may continue with the processing logic recording one or more hardware threads currently accessing the secure data in the secure enclave (540). The method 500 may continue with the processing logic sending an inter-processor interrupt (IPI) to one or more cores associated with the one or more hardware threads, to cause the one or more hardware threads to exit the secure enclave and flush translation lookaside buffers of the one or more cores (545). The method 500 may continue with the processing logic determining whether a page fault on the page has been detected before execution of a EWB/E instruction (550). If not, the method 500 may continue with the processing logic continuing with execution of the EWB/E instruction (555). If yes, a fault is detected, the method 500 may continue with the processing logic clearing the bit in the EPCM for the page mapped to the virtual address, to unblock creation of translations for access to the page in the secure enclave (560). The method 500 may continue with the processing logic marking the page as present in the page tables and the EPT (565).

Figure 6A:
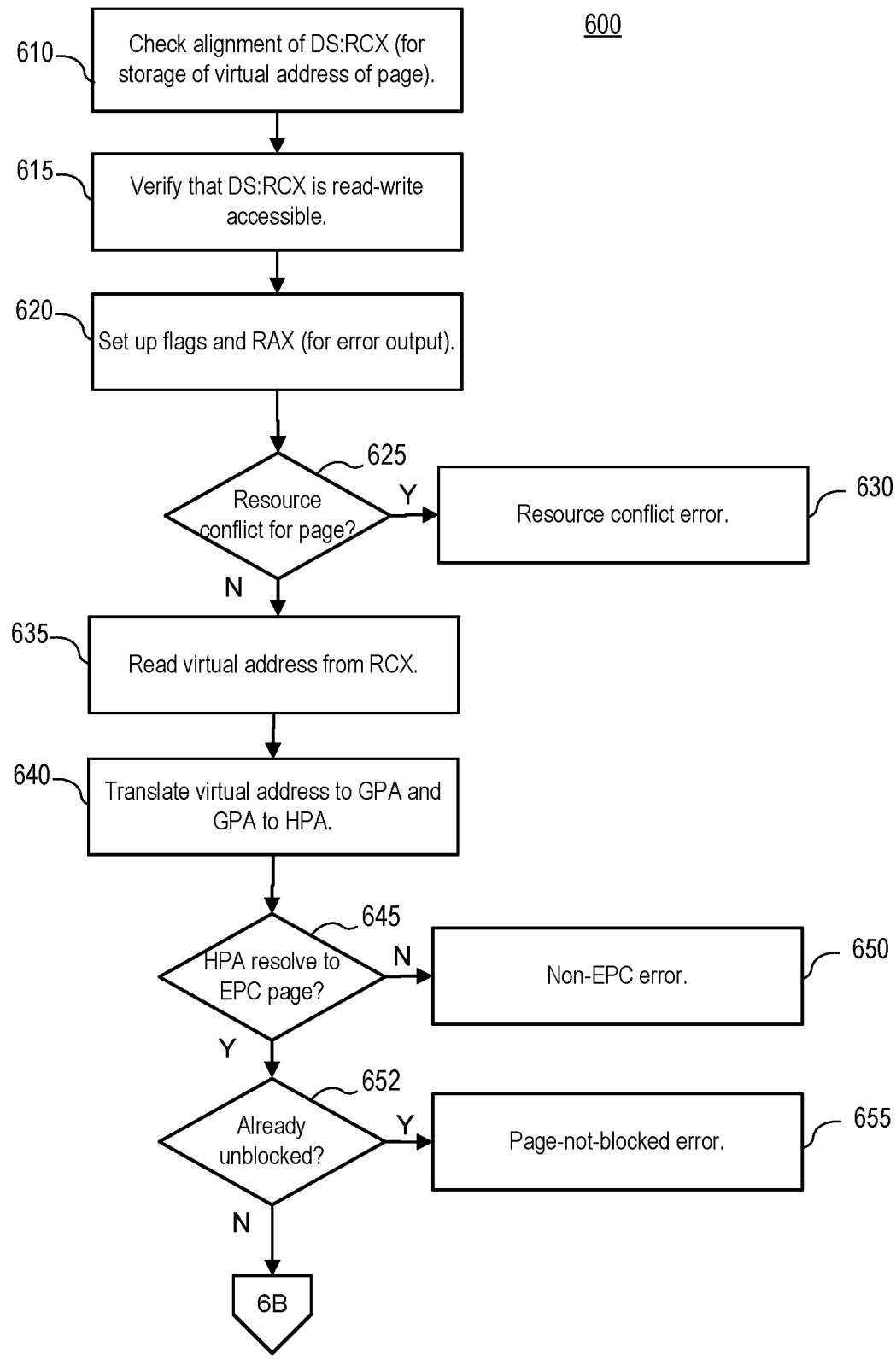
FIGS. 6A and 6B is a flow chart of a method for unblocking creation of further translations of the page after receipt of a page fault associated with the page, according to an alternative implementation.
Figure 6B:
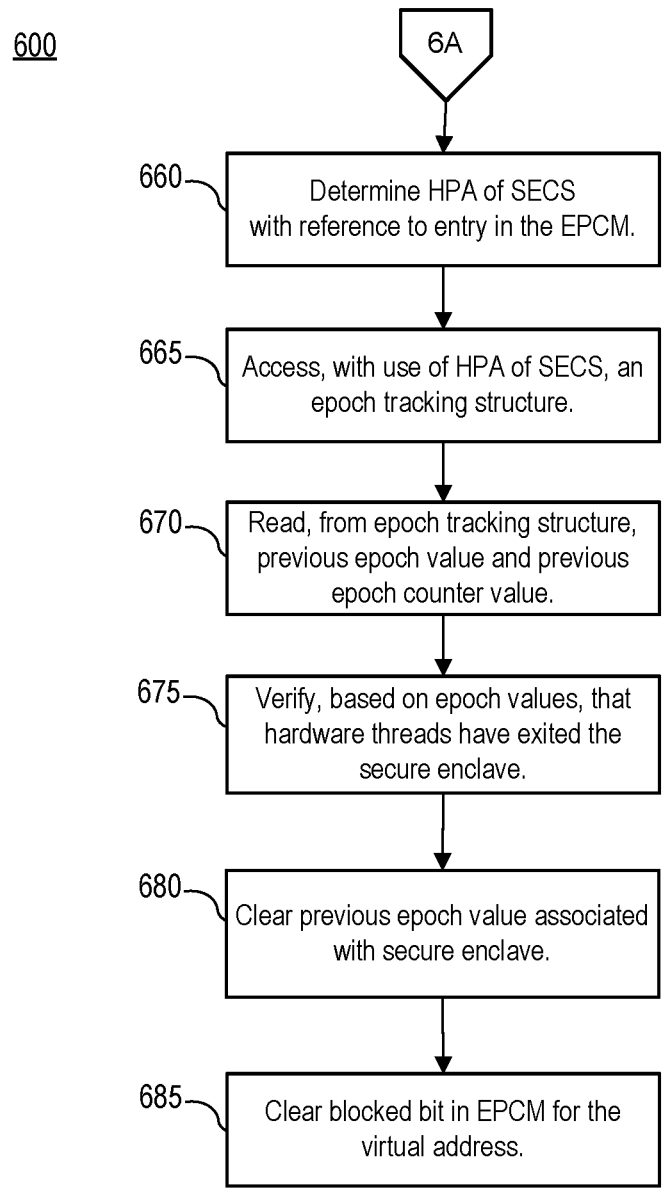

FIGS. 6A and 6B is a flow chart of a method 600 for unblocking creation of further translations of the page after receipt of a page fault associated with the page, according to an alternative implementation. The method 600 may be performed by processing logic that may include hardware (e.g., circuitry, dedicated logic, and/or programmable logic), software (e.g., instructions executable on a computer system to perform hardware simulation), or a combination thereof. In an illustrative example, the method 600 may be performed by the processor 110 of the system 100 of FIGS. 1-3, including by the secure enclave circuit 120. The method 600 is to explain additional details as to the execution of the EUNBLOCK instruction, which is to be executed when current privilege level is zero ("0").

The EUNBLOCK instruction may be executed to mark a page from the EPC (e.g., EPC_PAGE) as not blocked. The general purpose register RAX may receive an error code indicating the outcome of execution of the EUNBLOCK instruction. The general purpose register RCX may contain the virtual address of an EPC page. In some implementations, the address in the RCX register is an effective address, where the data segment (DS) may be used to create the virtual address. Segment override may not be supported. The EUNBLOCK instruction may fail when the operand is not properly aligned or does not refer to an EPC page or the page is in use by another thread. The RCX may have read/write permissions for the EPC_PAGE and may reference temporary variables listed in Table 1, according to one implementation. Other implementations are envisioned, including use of different registers than those mentioned as being used. The term "UINT" in Table 1 stands for unsigned integer.

TABLE 1

| Variable Name | Type | Size (bytes) | Description |
|---|---|---|---|
| TMP_SECS | Physical Address | 64 | Physical address of the SECS of page being removed |
| TMP_PBEPOCH | UINT64 | 8 | Snapshot of previous epoch value. |

TABLE 1-continued

| Variable Name | Type | Size (bytes) | Description |
|---|---|---|---|
| TMP_PBREFCOUNT | UINT64 | 8 | Snapshot of previous epoch counter value. |

With further reference to FIGS. 6A and 6B, the method 600 may begin with the processing logic checking the alignment of DS:RCX, which is an example of the register that may be used to store the virtual address of the page to be unblocked (610). The method 600 may continue with the processing logic verifying that DS:RCX is read-write accessible (615). The method 600 may continue with the processing logic setting up certain flags (RFLAGS) in the 64-bit special purpose registers (e.g., zeroed out) as well as the general purpose register, RAX, which is to receive error codes.

The method 600 may continue with the processing device determining whether a resource conflict for the page has been detected (625), e.g., to handle potential enclave entry race conditions. If a resource conflict is detected, the method 600 may continue with the processing logic writing a resource conflict error (e.g., RESOURCE_CONFLICT) to the RAX register (630). The conflict detection may occur after a failed attempt to lock the EPCM from accepting further entries. A ZF flag may also be set as a result of failure to acquire a lock on the EPCM, or if the page is invalid. The conflict detection may also be performed with use of transaction processing in which results of certain processing steps are abandoned if a resource conflict is ultimately detected by the end of the processing steps. If there is no resource conflict for the page, the method 600 may continue with reading the virtual address from the RCS (635).

The method 600 may continue with the processing logic translating the virtual address to its GPA and from the GPA to its HPA (640). The method 600 may continue with the processing logic determining whether the HPA resolves to an EPC page (e.g., it is a page in a secure enclave) (645). If it does not, the method 600 may continue with the processing logic writing a non-EPC error to the RAX register (650). If it does resolve to an EPC page, the method 600 may continue with the processing logic determining whether the page is already block (652). If the page is already blocked, the method 600 may continue with the processing logic writing a page-not-blocked error to the RAX register (655). A CF flag may also be set if the page is not blocked or if the page is not blockable for a detectable reason (e.g., not correct page type).

With additional reference to FIG. 6B, if the page is not already blocked, the method 600 may continue with the processing logic determining the HPA of the SECS with reference to entry in the EPCM (660). The method 600 may continue with the processing logic accessing, with use of the HPA of the SECS, an epoch tracking structure for the epoch of the current enclave (665). The method 600 may continue with the processing logic reading, from the epoch tracking structure, a previous epoch value and a previous epoch counter value into a set of local epoch registers (670). This is the protocol for ETRACK and EWB instruction. The ETRACK instruction tracks the state of the enclave with these epoch values and EWB verifies the enclave state by comparing the current and previous values. The method 600 may continue with the processing logic verifying, based on these epoch values, that hardware threads have exited the secure enclave (675). The method 600 may continue with the processing logic clearing the previous epoch value associated with the secure enclave (680). The method 600 may continue with the processing logic clearing the blocked bit in the EPCM for the virtual address of the page (685).

FIG. 7A is a diagram of a unified metadata structure information data structure (UMDSINFO) 700 (e.g., UMDSINFO data structure), according to implementations. FIG. 7B is a diagram of a data vector, also called a bit vector (BITVEC) 710 that is a part of the UMDSINFO data structure, according to implementations. The UMDSINFO 700 may include fields that encompass the BITVEC 710 as a set of bits that may be passed to the EWBE and ELDE instructions (see FIG. 10). The BITVEC 710 may also include the blocked bit from the EPCM and a USE_UMBDS bit, both which impact from where the blocked bit is obtained by the UMDS (see also FIG. 10).

In implementations, the SRCPGE entry in the UMDSINFO 700 holds a virtual address pointer (or in some cases an effective address pointer that, with segment calculations, may be turned into a virtual address pointer) to the non-EPC page whose contents will be copied into the newly allocated EPC page. Furthermore, the SECS entry may be a virtual address pointer to the EPC slot that currently contains a copy of the SECS, which identifies and defines the enclave with an enclave ID generated upon execution of the ECREATE instruction. Each sub-EPC page associated with the enclave includes a back-pointer to the SECS to be identified with that enclave.

FIG. 8 is a diagram of an extended version array (EVA) page 800, according to implementations. The "extended" in the EVA page 800 makes reference to the fact that the EVA page 800 may now store larger (64 byte) unified metadata structures (UMDS), one for each page stored in the secure enclave. Because the UMDS is larger than the version value, which was all that was conventionally stored in a version array page, the EVA page 800 has fewer slots (e.g., 64) than its predecessor (e.g., 512), the VA page. As noted in the "set by" field, the EWBE and ELDE instructions may store to and read from a UMDS stored in one of the slots. Furthermore, in one implementation, locks may be used to ensure an atomic update to write the value of the version field within the UMDS.

In implementations, the EVA page 800 may be allocated using the EMKEVA instruction, which takes the virtual address of a free EPC page, and turns it into a version array with empty slots. EVA pages are identified by the page type EVA-type in their EPCM entries Like VA pages, EVA pages have the ENCLAVEADDRESS fields in their EPCM entries set to zero, and cannot be accessed directly by any software, including enclaves.

Unlike with some of the other page types discussed so far, EVA pages are not associated with any enclave. This means EVA pages can be deallocated via the EREMOVE instruction without restriction. However, freeing up an EVA page whose slots are in use effectively discards the UMDSs in those slots, which results in losing the ability to load the corresponding evicted pages back into the EPC. Therefore, it is unlikely that a correct OS implementation will ever call EREMOVE on an EVA page with non-free slots. An EVA page, however, may also be removed from secure memory (e.g., paged out) as long as it may be linked (through hierarchical linking of EVA pages) to an EVA page that has not been paged out of secure memory.

FIG. 9 is a diagram of a unified metadata structure (UMDS) 900, according to implementations. The UMDS 900 is an example of the data structure that may be stored in one of the slots in the EVA page 800. Each UMDS 900 may store a number of fields at certain offsets. The UMDS 900 of FIG. 9 is one example, and other implementations are possible, including those that include more or less information, or that order the fields differently. The UMDS 900 may include, therefore, a version value (VERSION), a line address (LINADDR), which is to be encrypted, a flags field (UMDSFLAGS), a lock field (UMDSLock) that references a lock of certain microarchitecture (e.g., to ensure no resource conflict), a group of reserved bits (RESERVED), and a message authentication code (MAC) used for data authentication of the page. Note that Table 2 includes a list of exemplary flags for the UMDSFLAGS field.

TABLE 2

| Flag Name | Description |
| --- | --- |
| R | Bit value of 1 indicates that the page can be read from inside the enclave. Bit value of 0 indicates that the page cannot be read from inside the enclave. |
| W | Bit value of 1 indicates that the page can be written from inside the enclave. Bit value of 0 indicates that the page cannot be written from inside the enclave. |
| X | X: Bit value of 1 indicates that the page can be executed from inside the enclave. Bit value of 0 indicates that the page cannot be executed from inside the enclave. |
| PENDING | Bit value of 1 indicates that the page has been added by EAUG. Bit value 0 indicates either the page was not added by EAUG or the PENDING bit was cleared by EACCEPT. |
| MODIFIED | Bit value of 1 indicates that the page has been modified by EMODT. Bit value 0 indicates either the page has not been modified or that the MODIFED bit was cleared by EACCEPT. |
| PR | Bit value of 1 indicates that the page is undergoing a permission restriction operation. Bit value 0 indicates either that the page has not had its permissions restricted or that the PR bit has been cleared by another instruction. |
| B | Holds value of the BITVEC B bit set during EWBE |
| PAGE_TYPE | The type of page with which the UMDS is associated. |

Figure 10:
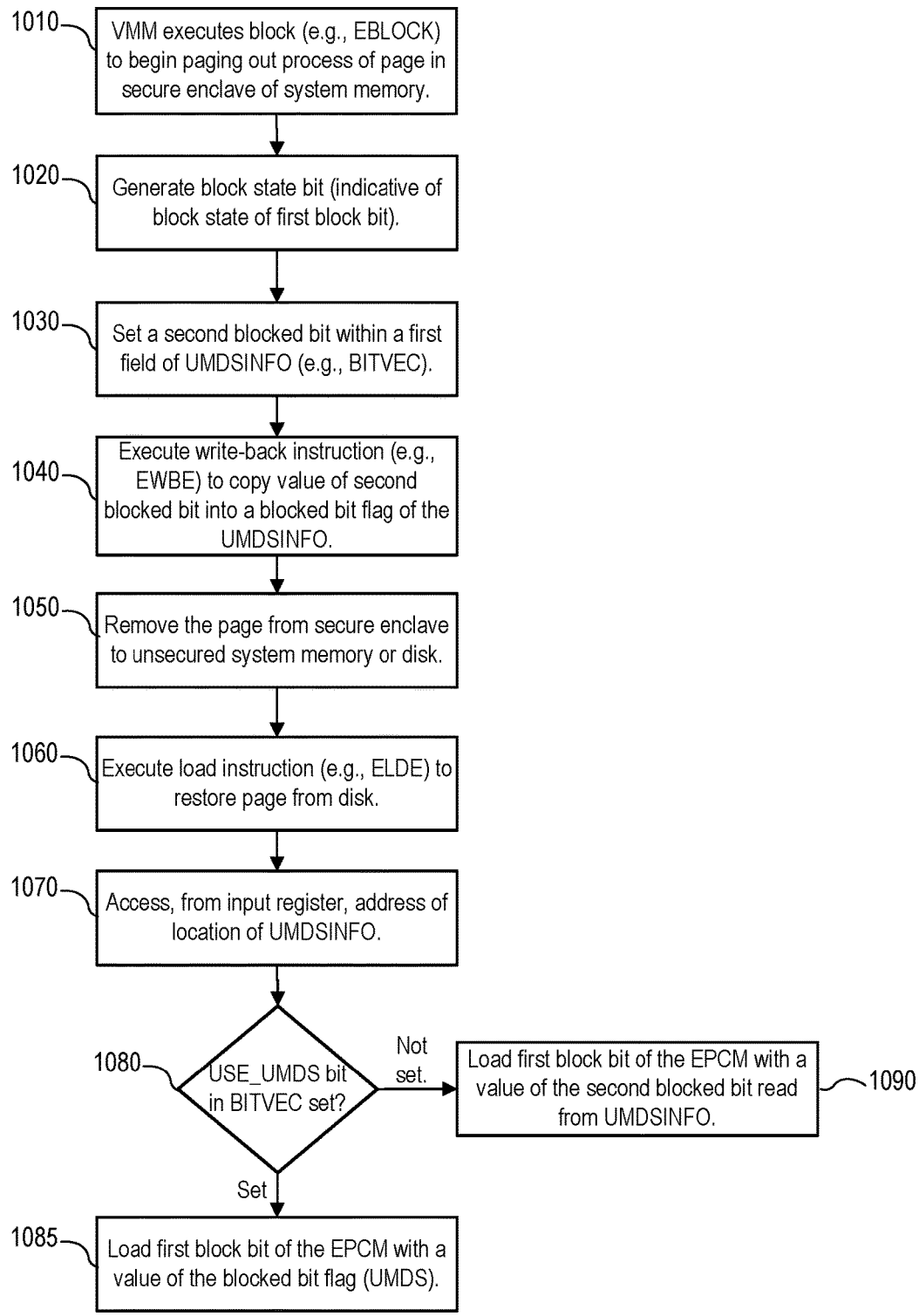
FIG. 10 is a flow chart of a method for passing a blocked bit between the UMDSINFO and flags of the UMDS during a write back, which may be referenced later during a load to restore a page to secure memory, according to implementations.

FIG. 10 is a flow chart of a method 1000 for passing a blocked bit (B) between the UMDSINFO and flags of the UMDS during a write back, which may be referenced later during a load to restore a page to secure memory, according to implementations. The method 1000 may be performed by processing logic that may include hardware (e.g., circuitry, dedicated logic, and/or programmable logic), software (e.g., instructions executable on a computer system to perform hardware simulation), or a combination thereof. In an illustrative example, the method 1000 may be performed by the processor 110 of the system 100 of FIGS. 1-3, including the VMM 124.

The method 1000 may begin with the processing logic executing an EBLOCK instruction to begin paging out process of a page in the secure enclave 162 of the system memory 160 (1010). The method 1000 may continue with the processing logic generating a block state bit, indicative of a state of the first block bit (1020). The method 1000 may continue with the processing logic, based on the block state bit, setting a second blocked bit within a first field of an information data structure (e.g., the BITVEC of the UMDSINFO, or information data structure) stored in the system memory (1030).

With continued reference to FIG. 10, the method 1000 may continue with the processing logic executing a writeback instruction (e.g., EBWE) to copy a value of the second blocked bit into a blocked bit flag of a UMDS, where the UMDS is to be stored in a version array page (e.g., an EVA page) of the secure enclave (1040). The method 100 may continue with the processing logic removing (e.g., paging out) the page from the secure enclave of the system memory to unsecured system memory or disk (1050). The method 1000 may continue with the processing logic executing a load instruction (e.g., ELDE) to restore the page from disk (1060). The method 1000 may continue with the processing logic accessing, within an input register like RCX, an address of the location of the UMDSINFO 700 (1070).

The method 1000 may continue with the processing logic determining whether the USE_UMDS bit in the bit vector of the UMDSINFO is set (1080). If the USE_UMDS bit is set, the method 1000 may continue with the processing logic loading the first blocked bit of the EPCM with a value of the blocked bit flag that is read from the UMDS (1085). If the USE_UMDS bit is not set (e.g., it is cleared), the method 1000 may continue with the processing logic loading the first blocked bit of the EPCM with a value of the second blocked bit that is read from the UMDSINFO, e.g., from the BITVEC 710 (1090).

Figure 11:
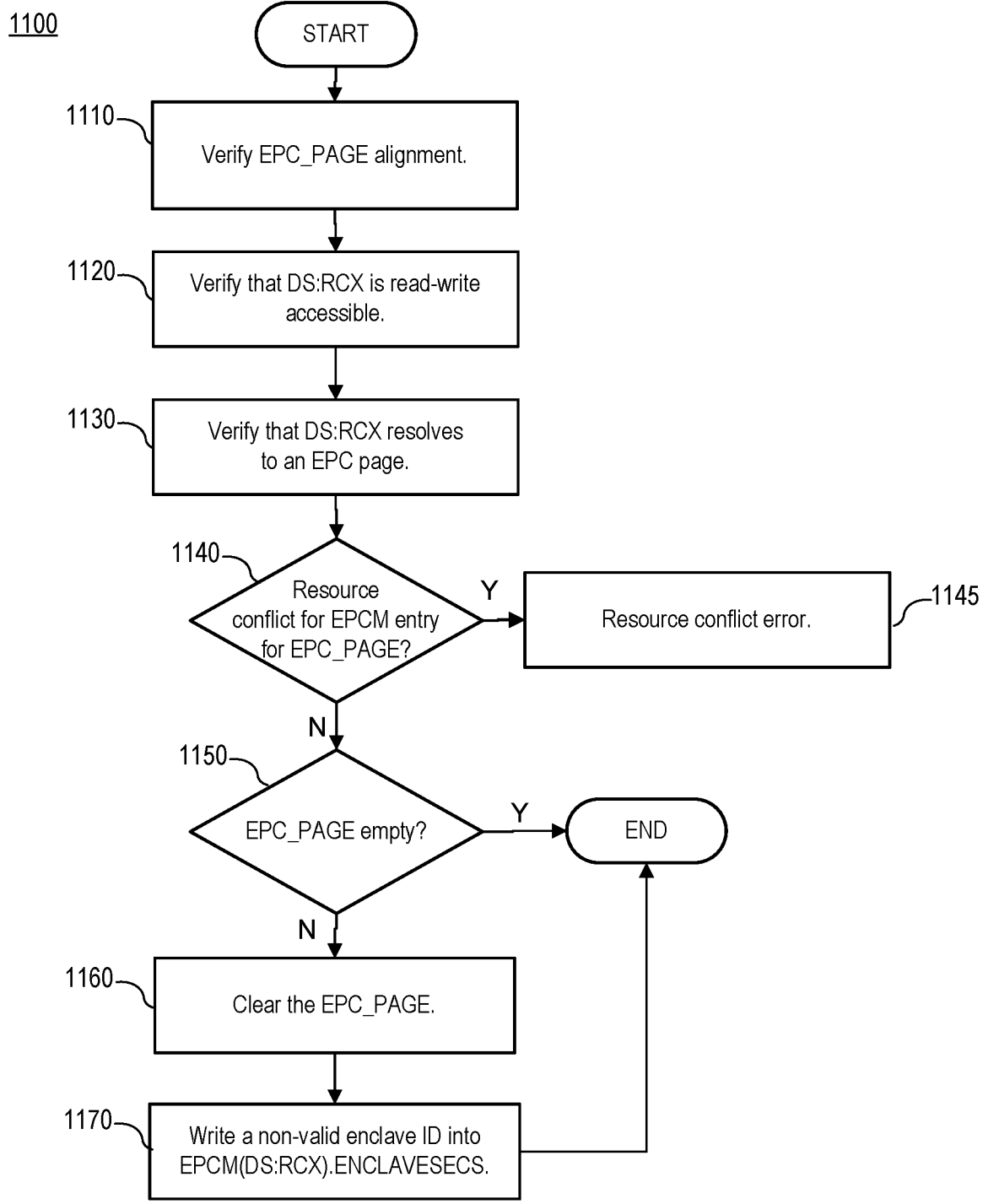
FIG. 11 is a flow chart of a method for creation of a version array page in advance of secure paging operations, according to implementations.

FIG. 11 is a flow chart of a method 1100 for creation of a version array page (e.g., an EVA page) in advance of secure paging operations, according to various implementations. The method 1100 may be performed by processing logic that may include hardware (e.g., circuitry, dedicated logic, and/or programmable logic), software (e.g., instructions executable on a computer system to perform hardware simulation), or a combination thereof. In an illustrative example, the method 1100 may be performed by the processor 110 of the system 100 of FIGS. 1-3, including by the secure enclave circuit 120. The features of the method 1100 may be drawn to execution of a enclave make extended version array (EMKEVA) instruction, which may create an empty EVA type in the EPC page (EPC_PAGE) whose logical address is given by the DS:RCX register and sets up EPCM attributes for that page. The memory parameter, [RCX]EPCPAGE, may provide write permissions with respect to EPC access.

The method 1100 may begin with the processing logic verifying page alignment of the EPC_PAGE, e.g., 4 KB alignment in one implementation (1110). The method 1100 may continue with the processing logic verifying that DS:RCX is read-write accessible (1120). The method 1100 may continue with the processing logic verifying that DS:RCX resolves to an EPC page (1130). The method 1100 may continue with the processing logic determining whether there is a resource conflict for the EPCM entry for the EPC_PAGE (1140). If yes, there is a resource conflict, the method 1100 may continue with the processing logic returning a resource conflict error (1145). If one implementation, a lock is acquired on the EPCM entry, and if the processing logic is unable to acquire the lock, an EPCM_LOCK_CONFLICT exception may result.

If no, there is not a resource conflict, the method 1100 may continue with the processing logic determining whether the EPC_PAGE is empty (1150). If the page is empty, the method 1100 ends as the EPC_PAGE is prepared to act as an EVA page. If the EPC_PAGE is not empty, the method 1100 may continue with the processing logic clearing the EPC_PAGE, e.g., zeroing out entries of the page located at DS:RCX. The method 1100 may continue with the processing logic writing a non-valid enclave ID into the EPCM entry for the EVA page, e.g., or otherwise marking the page as not belonging to any enclave (1170).

In various implementations, if any of the above checks fails, a general protection exception may result. Furthermore, if a page fault occurs in accessing memory operand, including EPCM-induced, fault, a page fault code may result.

Figure 12A:
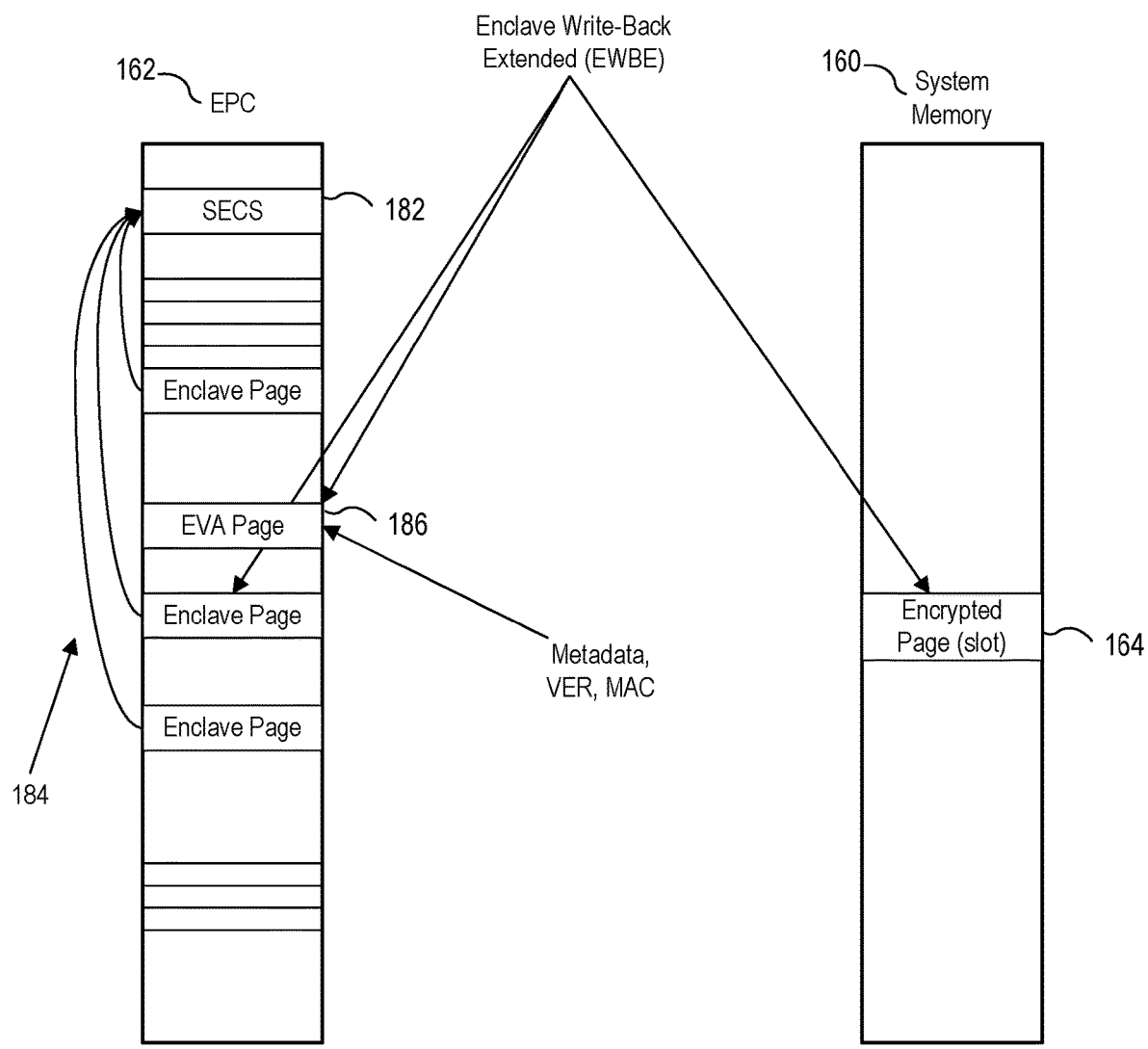
FIG. 12A is a block diagram illustrating secure enclaves and system memory data structures during a secure write back, according to implementations.

FIG. 12A is a block diagram illustrating secure enclaves and system memory data structures during a secure write back, e.g., execute the enclave write-back extended (EWBE) instruction, according to implementations. In one implementation, the processor 110 may execute the EWBE instruction to page out (e.g., remove) a secure page in the EPC 162 that has become idle, as previously discussed with reference to FIGS. 3-5. The EWBE may include fewer pointers than previously done in the EWB, in not needing to point to a separate location in the system memory 160 for a portion of the metadata. Now, the EVA page 186 may contain each UMDS, which may consolidate paging crypto metadata, the version, and the MAC for a page. In summary, the EWBE may point to the EVA page 186, the subject enclave page 184 to be paged out, and a slot for the encrypted page 164 in system memory.

Figure 12B:
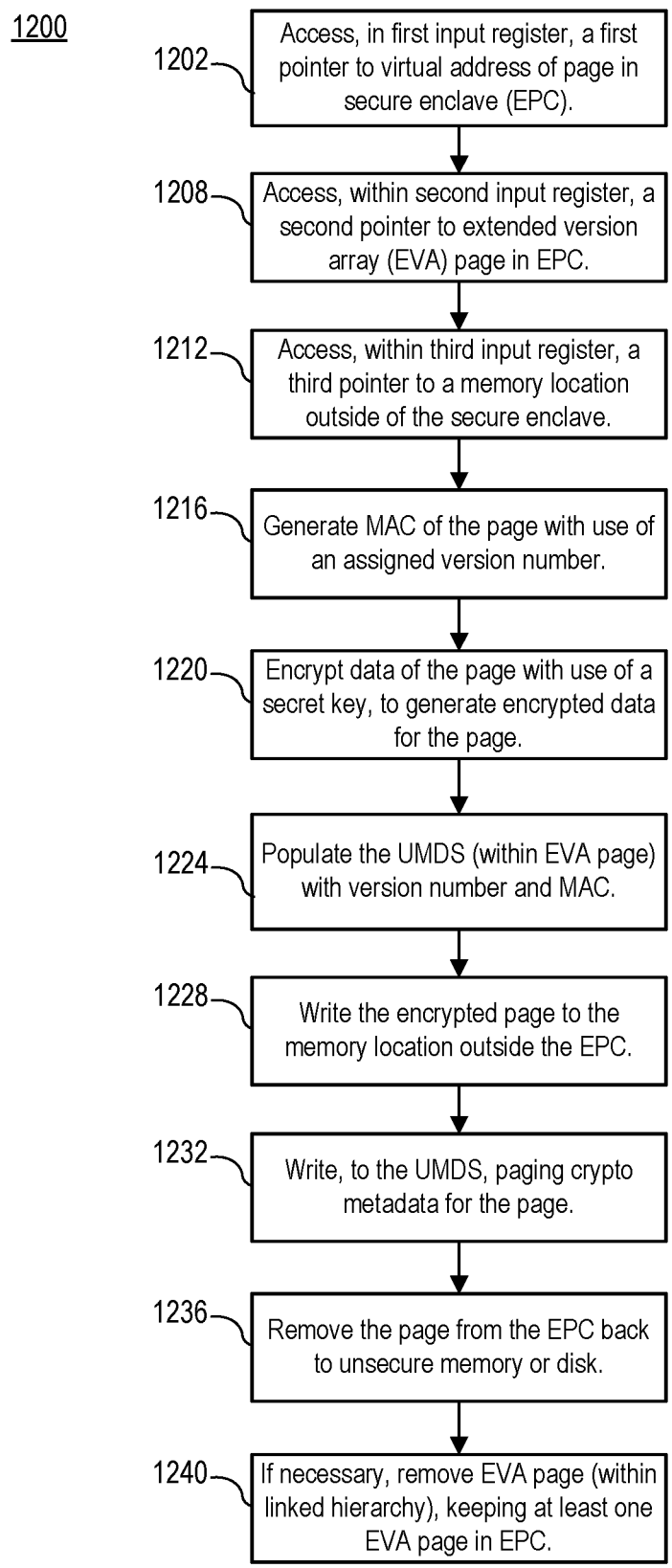
FIG. 12B is a flow chart of a method for performing a secure write back with reference to the data structures of FIG. 12A, according to one implementation.

FIG. 12B is a flow chart of a method 1200 for performing a secure write back with reference to the data structures of FIG. 12A, according to one implementation. The method 1200 details the execution of the EWBE instruction according to an implementation. The method 1200 may be performed by processing logic that may include hardware (e.g., circuitry, dedicated logic, and/or programmable logic), software (e.g., instructions executable on a computer system to perform hardware simulation), or a combination thereof. In an illustrative example, the method 1200 may be performed by the processor 110 of the system 100 of FIGS. 1-3, including by the secure enclave circuit 120.

The method 1200 may begin with the processing logic accessing, in a first input register (e.g., RCX) a first pointer to a virtual address of a page in the secure enclave (1202). The method 1200 may continue with the processing logic accessing, within a second input register (e.g., RDX), a second pointer to an extended version array (EVA) page in the EPC (1208). The method 1200 may continue with the processing logic accessing, within a third input register, a memory location outside of the secure enclave (1212). The method 1200 may continue with the processing logic generating a message authentication code (MAC) of the page with use of an assigned version number (1214).

The method 1200 may continue with the processing logic encrypting data for the page with use of a secret key, to generate encrypted data for the page (1220). The method 1200 may continue with the processing logic populating the UMDS, stored within the version array page, with the version number and the MAC (1224). The method 1200 may continue with the processing logic writing the encrypted data to the memory location outside of the secure enclave (1228). The method 1200 may continue with the processing logic writing, to the UMDS, paging crypto metadata for the page (1232). The method 1200 may continue with the processing logic removing (e.g., paging out) the page from the secure enclave back to unsecured memory or the disk (1236). The method 1200 may continue with the processing logic, if necessary, paging out the EVA page within a linked hierarchy, which links to at least a second EVA page that remains in the secure enclave (1240). In one implementation, the EVA page may be paged out using a VA page. Of course, the method 1200 may include additional or fewer steps, which may also be performed in a different order.

Figure 13A:
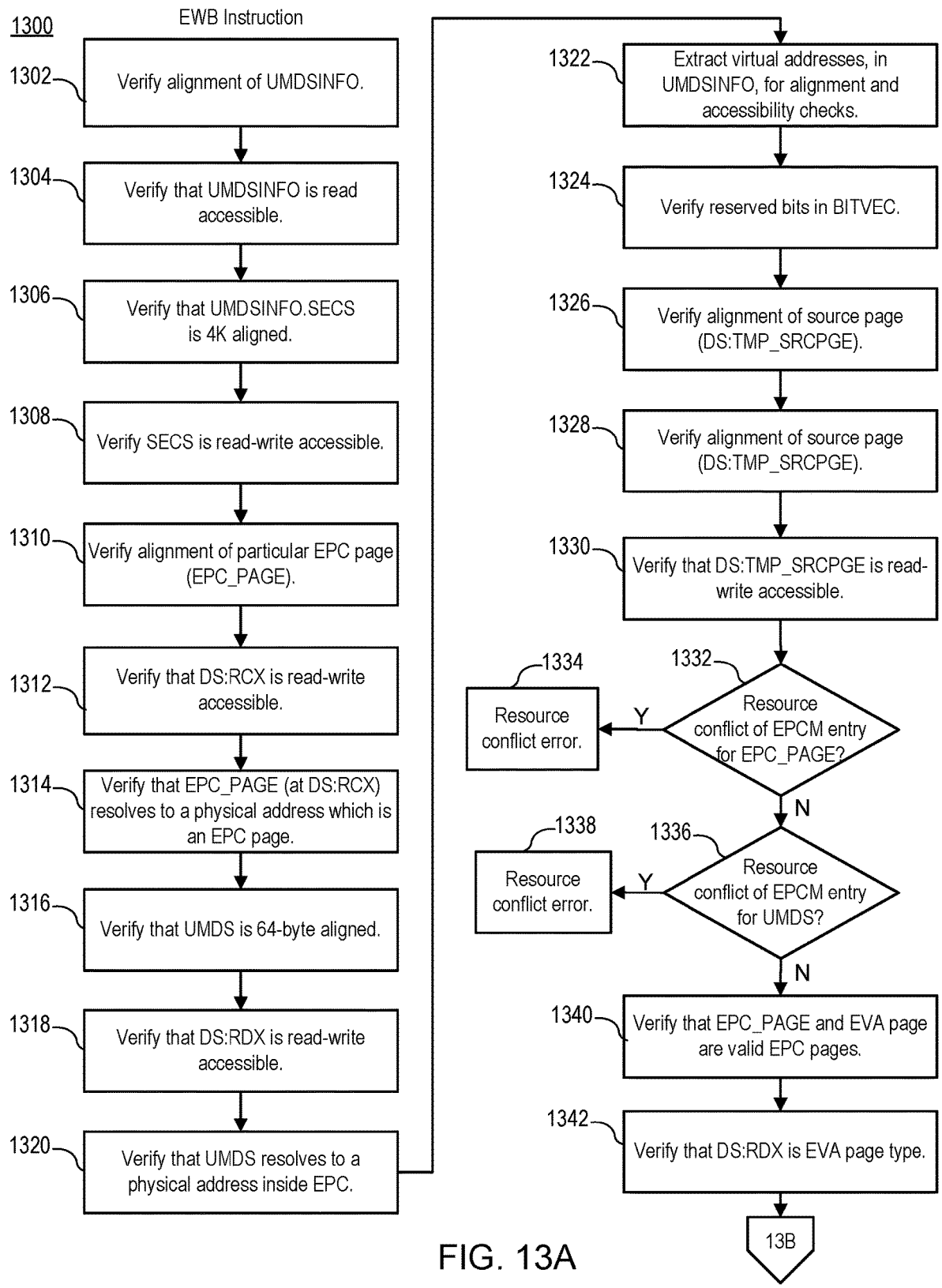
FIGS. 13A, 13B, and 13C are a flow chart of a method for performing a secure write back according to various other implementations.
Figure 13B:
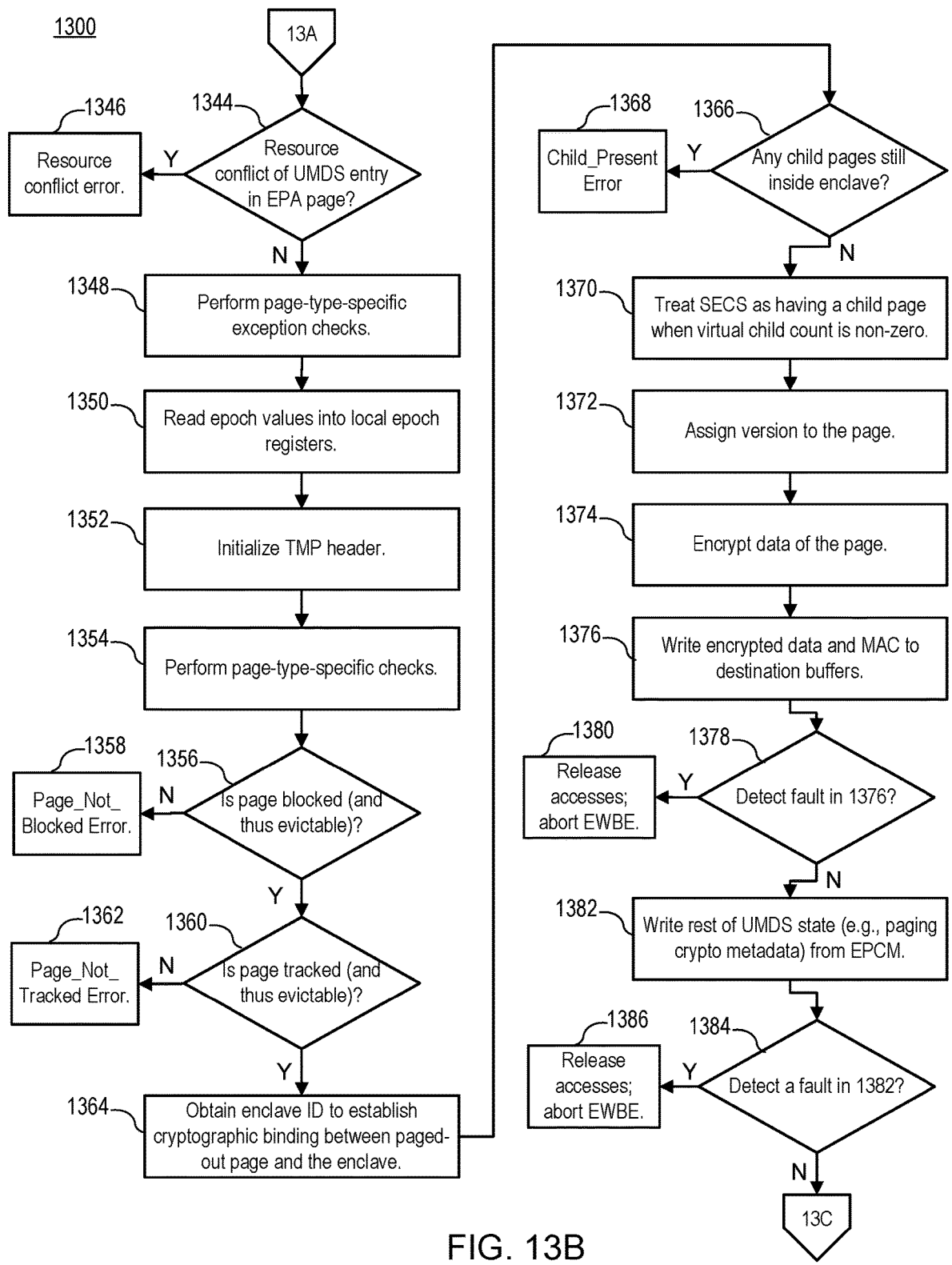
Figure 13C:
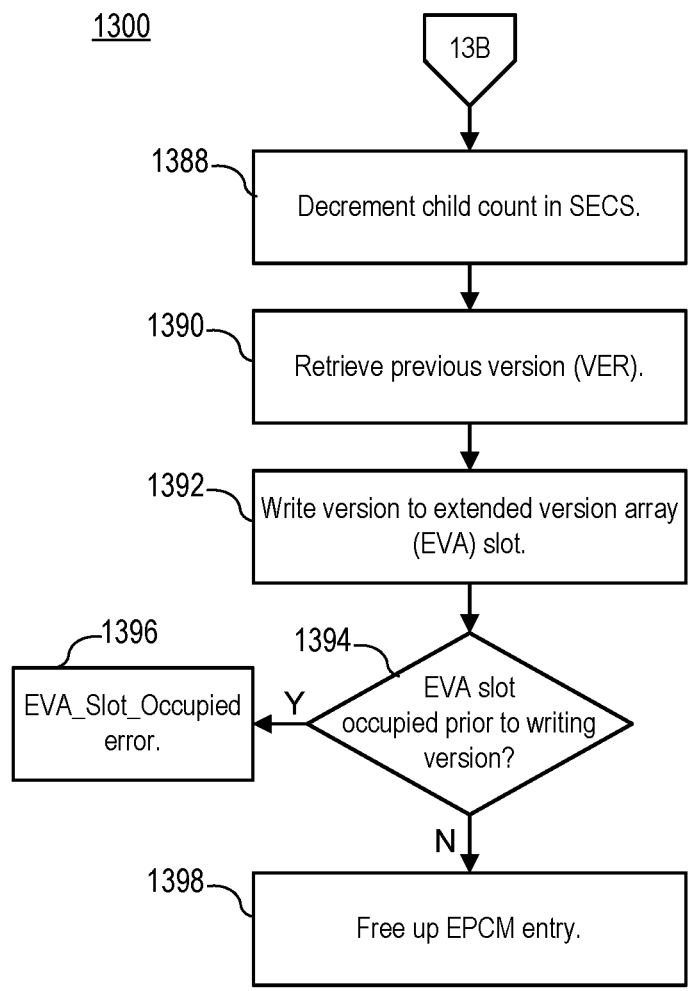

FIGS. 13A, 13B, and 13C are a flow chart of a method 1300 for performing a secure write back, e.g., via execution of the EWBE instruction, according to various other implementations. The method 1300 may be performed by processing logic that may include hardware (e.g., circuitry, dedicated logic, and/or programmable logic), software (e.g., instructions executable on a computer system to perform hardware simulation), or a combination thereof. In an illustrative example, the method 1300 may be performed by the processor 110 of the system 100 of FIGS. 1-3, including by the secure enclave circuit 120.

The EWBE instruction may transfer a page from an EPC page to a non-EPC page, including the copying process, which cryptographically protects the page. The EWBE instruction may be executed when the current privilege level is zero ("0"). The UMDSINFO is to be populated with the address of the SECS for the page being removed. Note that, with reference to resources that support execution of the EWBE instruction, Table 3 references memory parameter information, Table 4 references temporary variables, which may be saved in local registers, and Table 5 references error codes that may result from various checks or access conflicts. In one implementation, the RAX register may receive error codes (including GP exceptions page faults, and the error codes in Table 5), the RBX register may hold the address of the UMDSINFO, the RCS may hold the address of an EPC page, and the RDX may hold the address of an EVA slot for the EVA page. While specific values, registers, and codes are referenced, these are exemplary and supply but one implementation where other values, registers, and codes may be applied with the same or similar outcome, which generally generates the results of the method 1200.

TABLE 3

| Memory Parameter | Permissions | Semantics |
| --- | --- | --- |
| [RBX]UMDSINFO | RW | Non-EPC Access |
| [RBX]UMDSINFO.SRCPGE | RW | Non-EPC Access |
| [RBX]UMDSINFO.UMDS | RW | Non-EPC Access |
| [RBX]UMDSINFO.SECS | RW | EPC Access |
| [RCX]EPCPAGE | RW | EPC Access |
| [RDX]EVASLOT | RW | EPC Access |

TABLE 4

| Variable Name | Type | Size | Description |
| --- | --- | --- | --- |
| TMP_SRCPGE | Memory Page | 4 KB | |
| TMP_SECS | SECS | 4 KB | |
| TMP_BPREFCOUNT | UINT64 | 8 B | |
| TMP_HEADER | MAC Header | 128 B | |
| TMP_VER | UINT64 | 8 B | |
| TMP_PK | UINT128 | 16 B | Page encryption/MAC key. |

TABLE 5

| Error Code | Description |
| --- | --- |
| PAGE_NOT_BLOCKED | If page is not marked as blocked |
| NOT_TRACKED | If EWBE is racing with ETRACK |
| VA_SLOT_OCCUPIED | Version array slot contained valid entry |
| CHILD_PRESENT | Child page present while attempting to page out enclave |
| RESOURCE_CONFLICT | A conflict with other resource occurred |

With reference to FIGS. 13A, 13B, and 13C, and to Tables 3-5, the method 1300 may being with the processing logic verifying alignment of the UMDSINFO (or information data structure), e.g., for 32B alignment, and generate a GP exception if not (1302). The method 1300 may continue with the processing logic verifying that the UMDSINFO is read accessible (1304). The method 1300 may continue with the processing logic verifying that the UMDSINFO.SECS is 4K aligned, and generate a GP exception if not (1306). The method 1300 may continue with the processing logic verifying that the SECS is read-write accessible (1308).

The method 1300 may continue with the processing logic verifying alignment of a particular EPC page (hereinafter EPC_PAGE), e.g., aligned to a 4 KB page, and generate a GP exception if not so aligned (1310). The method 1300 may continue with the processing logic verifying that the DS:RCX is read-write accessible (1312). The method 1300 may continue with the processing logic verifying that the EPC_PAGE (at DS:RCX) resolves to a physical address which is an EPC page, and generate a page fault if it does not (1314). The method 1300 may continue with the processing logic verifying that the UMDS is 64-yte aligned, and generating a GP exception if not (1316). The method 1300 may continue with the processing logic verifying that DS:RDX is read-write accessible (1318). The method 1300 may continue with the processing logic verifying that the UMDS resolves to a physical address inside the EPC, and generate a page fault if not (1320).

The method 1300 may continue with the processing logic extracting a virtual address in the UMDSINFO for alignment and accessibility checks (1322). The method 1300 may continue with the processing logic verifying reserved bits in the BITVEC fields of the UMDSINFO (1324). The method 1300 may continue with the processing logic verifying alignment of a source page (TMP_SRCPGE), e.g., 4 KB aligned, and to result in a GP exception if not (1326). The method 1300 may continue with the processing logic verifying alignment of the source page (DS:TMP_SRCPGE) (1328). The method 1300 may continue with the processing logic verifying that DS:TMP_SCRCPGE is read-write accessible (1330).

The method 1300 may continue with the processing logic determining whether there is a resource conflict with the EPCM entry for EPC_PAGE (1332). If there is a conflict, the method 1300 may continue with the processing logic returning a resource conflict error, which may include a lock conflict exception if a lock was attempted (1334). If there is not a conflict, the method 1300 may continue with the processing logic determining whether there is a read conflict for the EPCM entry for the UMDS stored in a slot of the EVA page (1336). If this is a lock, the VMM should not share the EVA with a guest, so no VMEXIT may be needed. If there is a read conflict with the EPCM entry for the UMDS, the method 1300 may result in a resource conflict error, which in one implementation is an EPC_PAGE_CONFLICT error (1338).

The method 1300 may continue with the processing logic verifying that the EPC_PAGE and the EVA page are valid EPC pages (1340), and that DS:RDX is EVA page type (1342), and return a page fault if not. The method 1300 may continue with the processing logic determining whether there is a resource conflict of a UMDS entry in the EVA page (1344). If it is a lock, the VMM should not share the EVA page with a guest so no VMEXIT may be needed. If there is a resource conflict with the UMDS entry, the method 1300 may continue with the processing logic returning a resource error, e.g., an EPC_PAGE_CONFLICT error, which may include setting the ZF flag (1346). The method 1300 may continue with the processing logic performing a page-type-specific exception check, which may include a check that the SECS passed in the UMDINFO.SECS matches the back pointer to the SECS, and generate a GP protection exception if not (1348).

The method 1300 may continue with the processing logic reading epoch values (e.g., TMP_PBEPOCH and TMP_P-BREFCOUNT) into local epoch registers (1350). The method 1300 may continue with the processing logic initializing the TMP_HEADER of SECINFO, leaving SECINFO in the field to reduce validation (1352). The method 1300 may continue with the processing logic performing page-type-specific checks (1354). The method 1300 may continue with the processing logic determining whether the page is blocked, and is thus evictable (1356). If the page is not blocked, the method 1300 may continue with the processing logic returning a PAGE_NOT_BLOCKED error (1358). If the page is blocked, the method 1300 may continue with the processing logic determining whether the page is tracked, and thus evictable (1360). If the page is not tracked, the method 1300 may continue with the processing logic returning a PAGE_NOT_TRACKED error (1362). The method 1300 may continue with the processing logic obtaining an enclave ID to establish cryptographic binding between paged-out page and the enclave (1364).

The method 1300 may continue with the processing logic determining whether there are any child pages still inside the enclave (1366). If there are, the method 1300 may continue with the processing logic returning a CHILD_PRESENT error (1368). If there are no more child pages inside the enclave, the method 1300 may continue with the processing logic treating the SECS as having a child page when the virtual child count is non-zero (1370). The method 1300 may continue with the processing logic assigning a version, e.g., a TMP_VER value to the page (1372). The method 1300 may continue with the processing logic encrypting data of the page (1374). The method 1300 may continue with the processing logic writing the encrypted data and the MAC to destination buffers (1376).

The method 1300 may continue with the processing logic determining whether a fault is detected in the write of block 1376 (1378). If a fault is detected, method 1300 may continue with the processing logic releasing data structure accesses and abort the EWBE instruction (1380). If a fault is not detected, method 1300 may continue with the processing logic writing the rest of the UMDS state (e.g., paging crypto metadata) from the EPCM (1382). The method 1300 may continue with the processing logic determining whether a fault is detected in the write of block 1382 (1384). If a fault is detected, the method 1300 may continue with the processing logic releasing data structure accesses and aborting the EWBE instruction (1386). If there is no fault detected, the method 1300 may continue with the processing logic decrementing the child count in the SECS (1388). The method 1300 may continue with the processing logic retrieving a previous version (PREV_VER) value and store it in the UMDS(DS:RDX).VERSION (1390). The method 1300 may continue with the processing logic writing the version writing the version to the EVA slot, e.g., UMDS (DS:RDX).VERSION is written to TEMP_VER (1392).

The method 1300 may continue with the processing logic determining whether the EVA slot is occupied prior to writing the version (1394). If the EVA slot is occupied, the method 1300 may continue with the processing logic returning an EVA_SLOT_ OCCUPIED error (1396). The method 1300 may continue with the processing logic freeing up an EPC entry, e.g., EPCM.(DS:RCX).VALID is zeroed out (1398). Any remaining resources may also be released. Furthermore, the ZF flag may be set if the page is not blocked, page is not tracked, there is a conflict with state, or a child is present; otherwise, the ZF flag is cleared. The CF flag, furthermore, may be set if the EVA slot is previously occupied; else, the CF flag is cleared. The RAX may be set to the error code.

Figure 14A:
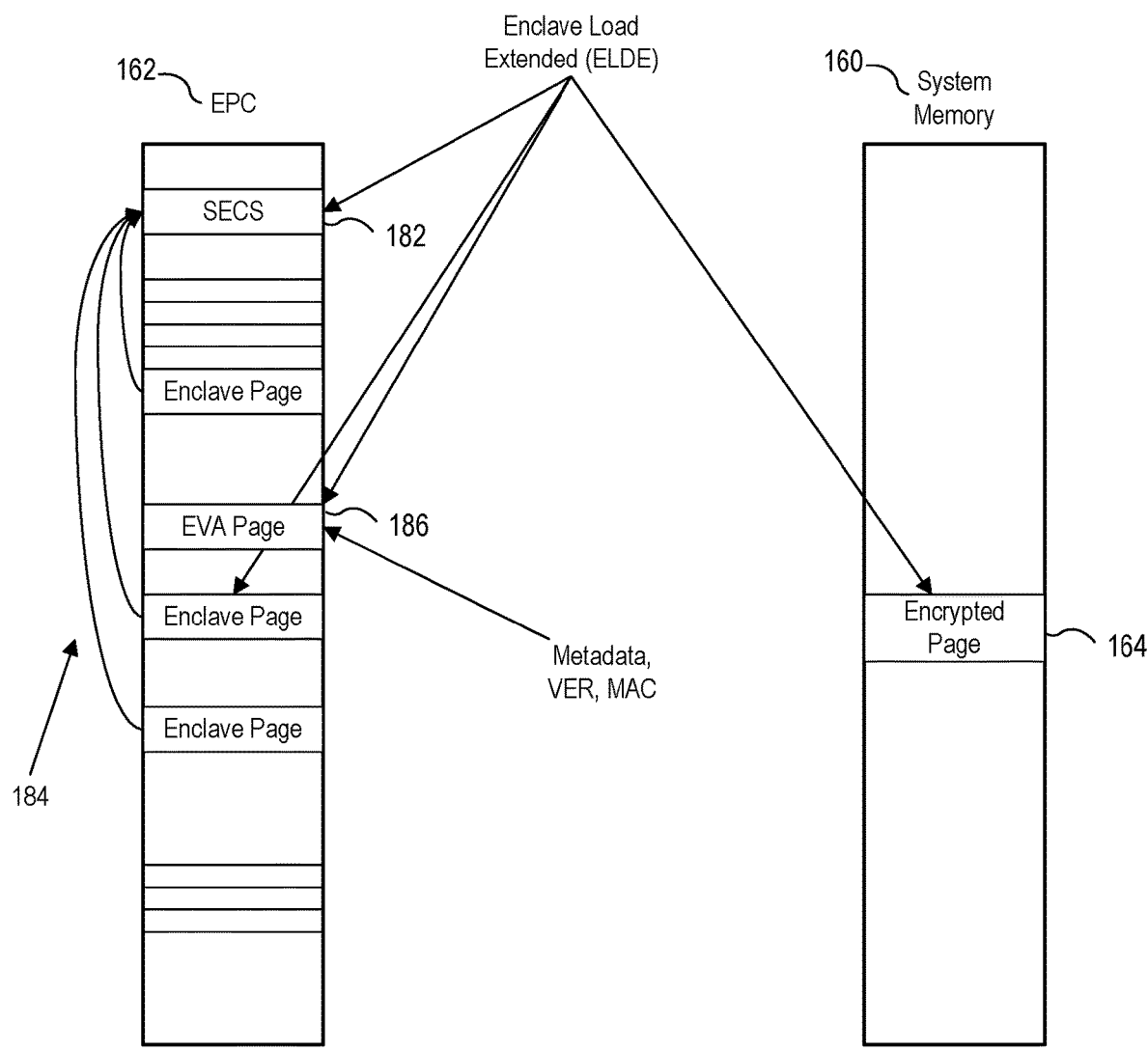
FIG. 14A is a block diagram illustrating secure enclaves and system memory data structures during a secure load, according to implementations.

FIG. 14A is a block diagram illustrating secure enclaves and system memory data structures during a secure load, e.g., execution of the ELDE instruction, according to implementations. Note that, once again, the number of pointers has been reduced in the ability to execute the ELDE instruction compared to execution of the ELD instruction. Here, there is no additional pointer to metadata stored in the system memory 160 in order combine the metadata when restoring a page from disk to secure memory. In summary, the ELDE instruction may retrieve a pointer to the SECS 182, a pointer to the EVA page 186, a pointer to a slot at which to load the enclave page 184, and a pointer to the encrypted page 164 in the system memory 160.

Figure 14B:
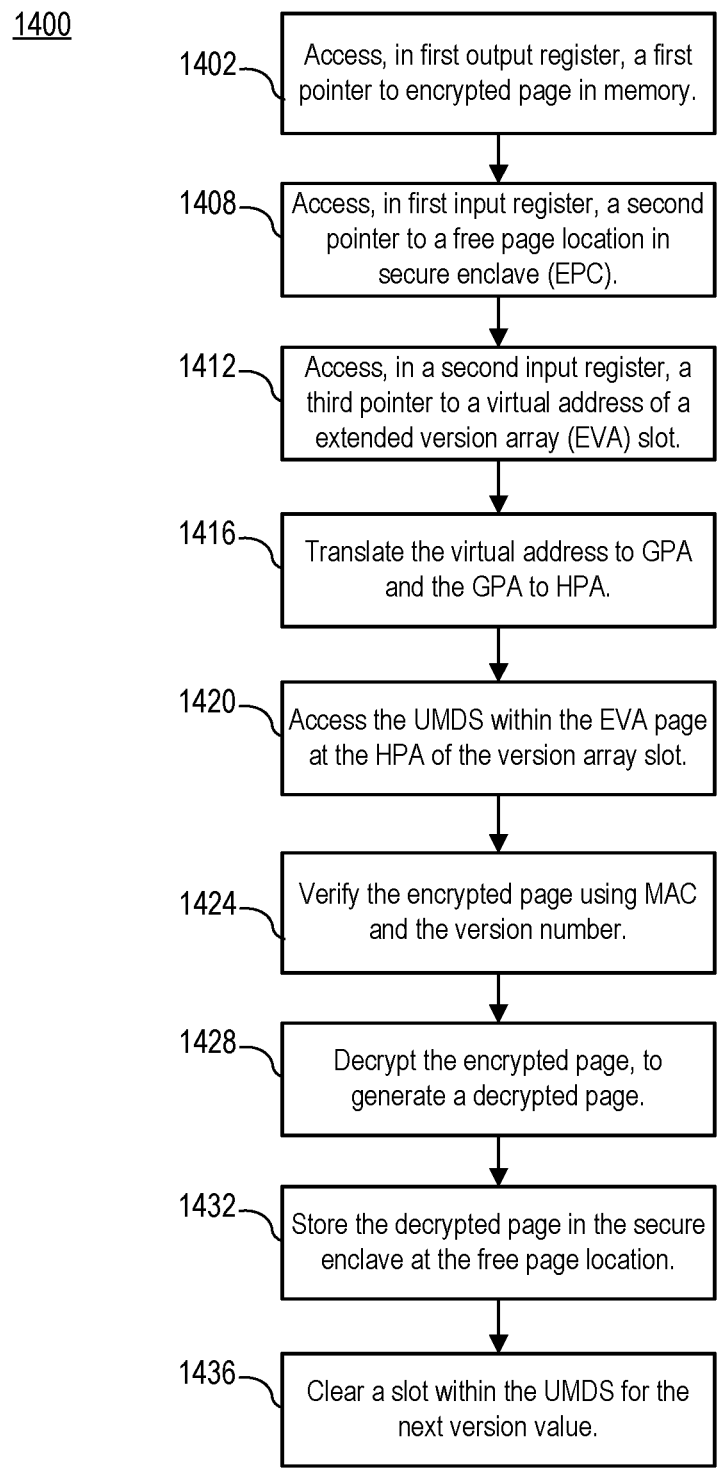
FIG. 14B is a flow chart of a method for performing a secure load with reference to the data structures of FIG. 14A, according to one implementation.

FIG. 14B is a flow chart 1400 of a method for performing a secure load, e.g., executing the ELDE instruction, with reference to the data structures of FIG. 14A, according to one implementation. The method 1400 may be performed by processing logic that may include hardware (e.g., circuitry, dedicated logic, and/or programmable logic), software (e.g., instructions executable on a computer system to perform hardware simulation), or a combination thereof. In an illustrative example, the method 1400 may be performed by the processor 110 of the system 100 of FIGS. 1-3, including by the secure enclave circuit 120.

The method 1400 may begin with the processing logic accessing, in an output register, a first pointer to the encrypted page at the memory location (1402). The method 1400 may continue with the processing logic accessing, in an input register (e.g., RCX), a second pointer to a free page location in the secure enclave (EPC) (1408). The method 1400 may continue with the processing logic accessing, in a second input register, the third pointer to a virtual address of a version array slot (for the EVA page) in the secure enclave (1412). The method 1400 may continue with the processing logic translating the virtual address to a guest physical address, and the guest physical address to a host physical address for the version array page (1416).

The method 1400 may continue with the processing logic accessing the UMDS within the EVA page at the host physical address of the version array slot (1420). The method 1400 may continue with the processing logic verifying the encrypted page using the MAC and the version number (1424). The method 1400 may continue with the processing logic decrypting the encrypted data, to generate decrypted data for the page (1428). The method 1400 may continue with the processing logic storing the decrypted data in the secure enclave at the free page location (1432). The method 1400 may continue with the processing logic clearing a slot within the UMDS for a next version value (1436).

Figure 15A:
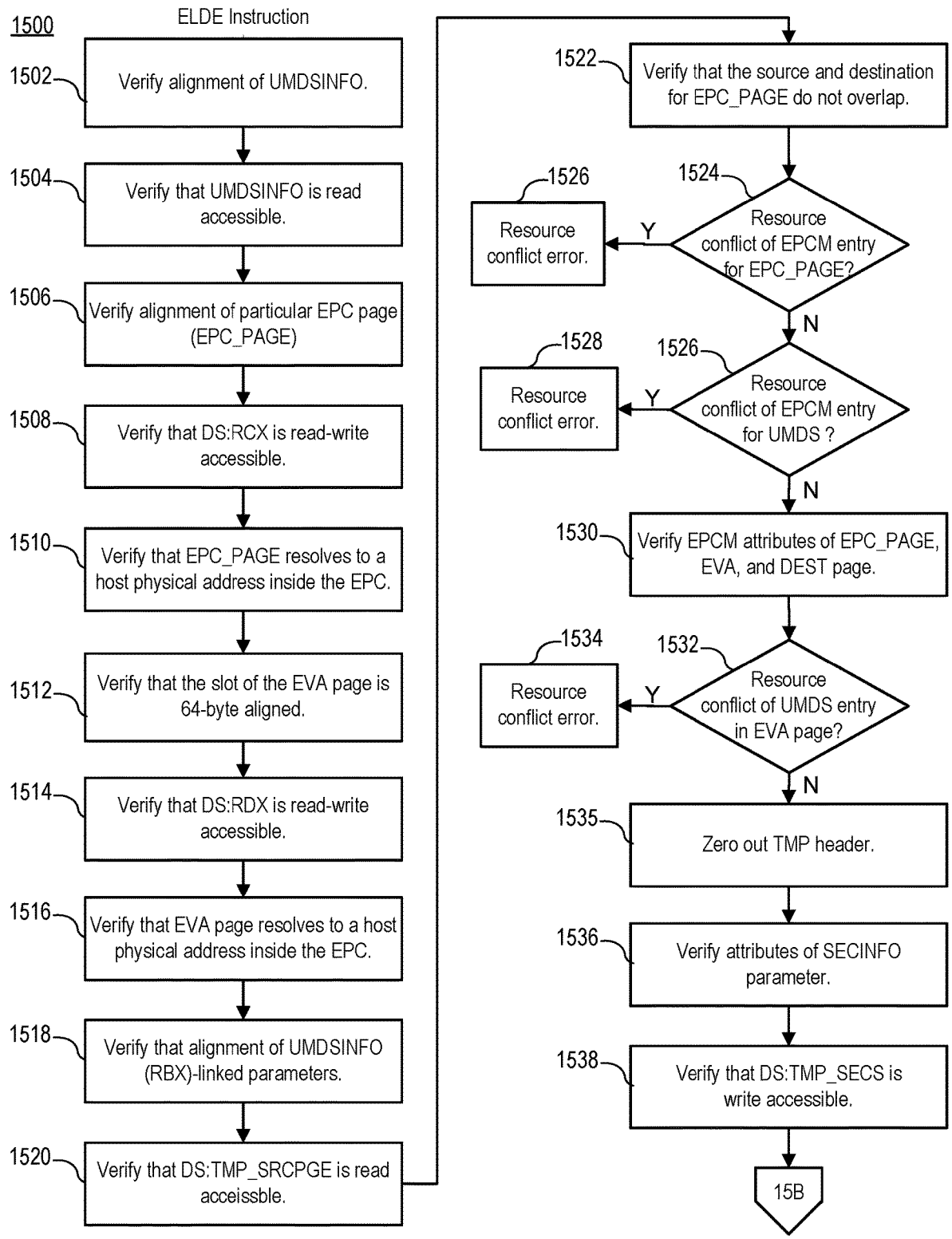
FIGS. 15A and 15B is a flow chart of a method for performing a secure load according to various other implementations.
Figure 15B:
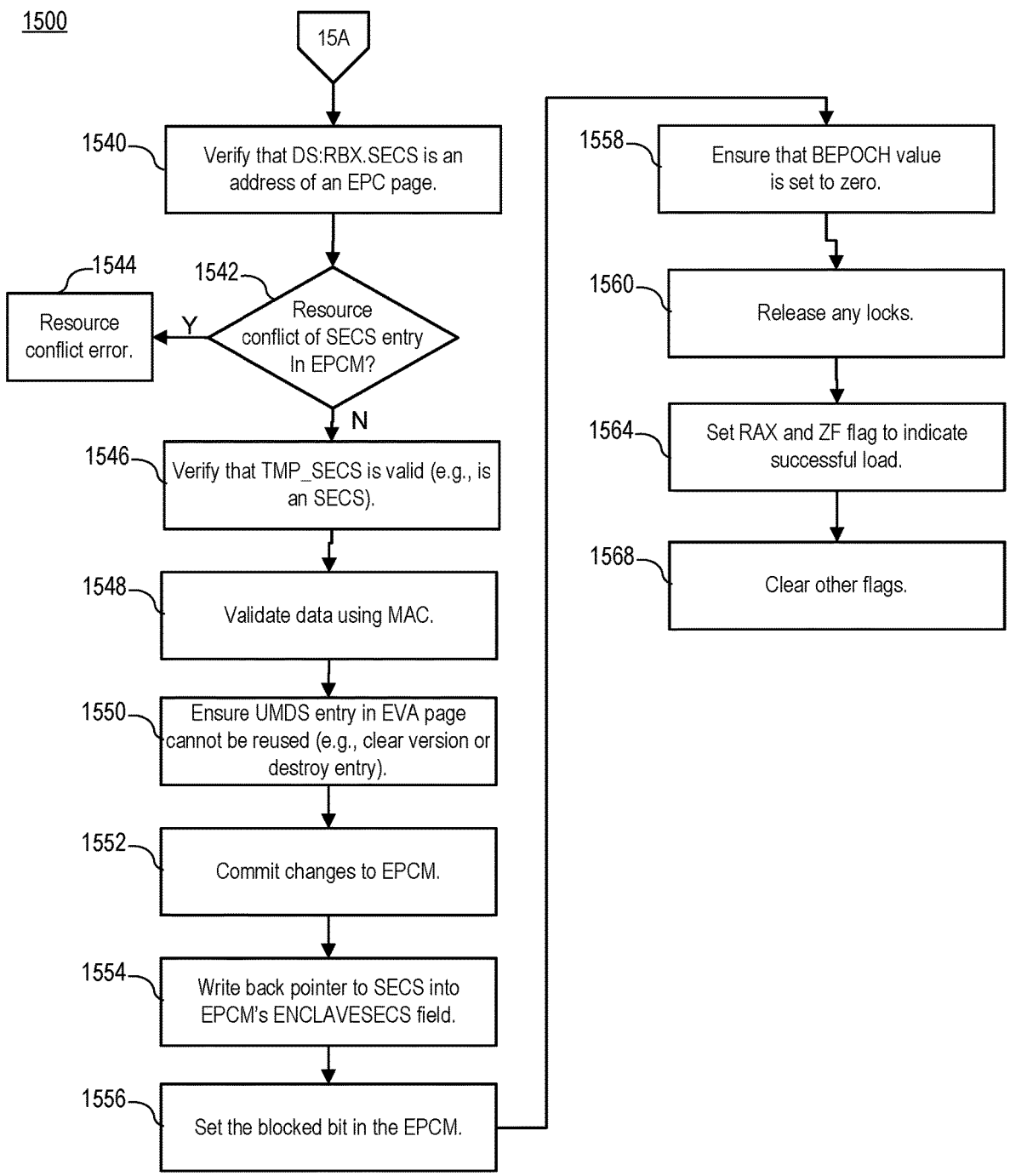

FIGS. 15A and 15B is a flow chart of a method 1500 for performing a secure load, e.g., execution of the ELDE, according to various other implementations. The method 1500 may be performed by processing logic that may include hardware (e.g., circuitry, dedicated logic, and/or programmable logic), software (e.g., instructions executable on a computer system to perform hardware simulation), or a combination thereof. In an illustrative example, the method 1500 may be performed by the processor 110 of the system 100 of FIGS. 1-3, including by the secure enclave circuit 120.

The ELDE instruction may copy a page from unprotected memory to an EPC page. As part of the copying, the page may be cryptographically authenticated and decrypted. This instruction may be executed when the current privilege level is zero ("0"). Note that, with reference to resources that support execution of the ELDE instruction, Table 6 references memory parameter information, Table 7 references temporary variables, which may be saved in local registers, and Table 8 references error codes that may result from various checks or access conflicts. Furthermore, the register RBX may hold the virtual address of the UMDSINFO data structure, the RCX may hold the virtual address of an EPC page, and the RDX may hold the logical address of an EVA slot. While specific values, registers, and codes are referenced, these are exemplary and supply but one implementation where other values, registers, and codes may be applied with the same or similar outcome, which generally generates the results of the method 1400.

TABLE 6

| Memory Parameter | Permissions | Semantics |
| --- | --- | --- |
| [RBX]UMDSINFO | R | Non-EPC Access |
| [RBX]UMDSINFO.SRCPGE | R | Non-EPC Access |
| [RBX]UMDSINFO.UMDS | R | Non-EPC Access |
| [RBX]UMDSINFO.SECS | RW | EPC Access |
| [RCX]EPCPAGE | RW | EPC Access |
| [RDX]EVASLOT | RW | EPC Access |

TABLE 7

| Variable Name | Type | Size | Description |
| --- | --- | --- | --- |
| TMP_SRCPGE | Memory Page | 4 KB | |
| TMP_SECS | Memory Page | 4 KB | |
| TMP_HEADER | MACHEADER | 128 B | |
| TMP_VER | UINT64 | 8 B | |
| TMP_MAC | UINT128 | 16 B | |
| TMP_PK | UINT128 | 16 B | Page encryption/MAC key. |

TABLE 8

| Error Code | Description |
| --- | --- |
| MAC_COMPARE_FAIL | If the MAC check fails |
| RESOURCE_CONFLICT | Failure to acquire one of the locks or a resource conflict (ELDBC/ELDUC) |

With reference to FIGS. 15A and 15B, the method 1500 may begin by the processing logic verifying alignment of the UMDSINFO data structure, e.g., that it is 32 B aligned, else return a GP exception (1502). The method 1500 may continue with the processing logic verifying that the UMDSINFO is read accessible (1504). The method 1500 may continue with the processing logic verifying the alignment of a particular EPC page, hereinafter "EPC_PAGE" (1506). The method 1500 may continue with the processing logic verifying that the value in the DS:RCX register is read-write accessible (1508). The method 1500 may continue with the processing logic verifying that the EPC_PAGE resolves to a host physical address inside the EPC, else return a page fault (1510).

The method 1500 may continue with the processing logic verifying that the slot of the EVA page in the EPC 162 is 64-byte aligned or other appropriate alignment (1512). The method 1500 may continue with the processing logic verifying that register DS:RDX is read-write accessible (1514). The method 1500 may continue with the processing logic verifying that the EVA page resolves to a host physical address inside the EPC, else return a page fault (1516). The method 1500 may continue with the processing logic verifying the alignment of UMDSINFO-linked parameters in the RBX register are 4 KB aligned, else return a GP exception (1518). The method 1500 may continue with the processing logic verifying that DS_TMP_SRCPGE is read accessible (1520). The method 1500 may continue with the processing logic verifying that the source and destination for the EPC_PAGE do not overlap (1522).

The method 1500 may continue with the processing logic determining whether there is a resource conflict of an EPCM entry for the EPC_PAGE (1524). If there is a resource conflict, the method 1500 may continue with the processing logic returning a resource conflict error, e.g., which may be an EPC_PAGE_CONFLICT error in one implementation (1526). The method 1500 may continue with the processing logic determining whether there is a resource conflict of an EPCM entry for the UMDS (1526). If there is a resource conflict, the method 1500 may continue with the processing logic returning a resource conflict error, which may be an EPC_PAGE_CONFLICT error in one implementation (1528). The method 1500 may continue with the processing logic verifying the EPCM attributes of the EPC_PAGE, the EVA page, and the DEST page, e.g., destination EPC page for the load operation, and generate a page fault if an attribute is not able to be verified (1530).

The method 1500 may continue with the processing logic determining whether there is a resource conflict of the UMDS entry in the EVA page (1532). If there is a resource conflict, the method 1500 may continue with the processing logic generating a resource conflict error, which may be an EPC_PAGE_CONFLICT error in one implementation. (1534). In addition to the error, a bit in the ZF flag may also be set in one implementation. The VMM should not share the EVA page with the guest. The method 1500 may continue with the processing logic zeroing at the TMP header, e.g., the TMP_HEADER value (1535). The method 1500 may continue with the processing logic verifying attributes of the SECINFO parameter, and generate a GP exception if not verified (1536). The method 1500 may continue with the processing logic verifying that the DS_TMP_SECS is write accessible (1538).

With additional reference to FIG. 15B, the method 1500 may continue with the processing logic verifying that DS:RBX.SECS is an address of an EPC page (1540). The method 1500 may continue with the processing logic determining whether there is a resource conflicts of a SECS entry in the EPCM (1542). If there is a resource conflict, the method 1500 may continue with the processing logic generating a resource conflict error, which may be an EPC_PAGE_CONFLICT error if a lock of the EPCM entry was attempted (1544). In addition to the error, a bit in the ZF flag may also be set in one implementation. The method 1500 may continue with the processing logic verifying that the SECS is valid, e.g., is an SECS page, and generate a page fault if not (1546). The method 1500 may continue with the processing logic validating data for the page using the MAC (1548).

The method 1500 may continue with the processing logic ensuring that the UMDS entry in the EVA page cannot be reused, e.g., which may be performed by clearing a version value of the UMDS (1550). The method 1500 may continue with the processing logic committing changes to the EPCM (1552). Such changes may be made by way of the temporary (TMP) value stored in temporary control registers (1552). To perform this committal of changes, the processing logic may associate the page with DS:TMP_SECS through the EPCM back pointer for the page. The method 1500 may continue with the processing logic writing a back pointer to the SECS into the EPCM's ENCLAVESECS field (1554). The method 1500 may continue with the processing logic setting the blocked bit in the EPCM (1556). If the TMP_HEADER.SECINFO.FLAGS.PT is not SECS, VA, or EVA page type, the blocked bit may be set to TMP_HEADER.SECINFO.FLAGS.B; otherwise, the blocked bit in the EPCM may be set to zero ("0").

The method 1500 may continue with the processing logic ensuring that the BEPOCH value is set to zero (1558). The method 1500 may continue with the processing logic releasing any remaining locks, in the case that locks were used to prevent resource conflicts (1560). The method 1500 may continue with the processing logic setting RAX and the ZF flag to indicate a successful load operation has completed (1564). The method 1500 may continue with the processing logic clearing other flags that are no longer in use due to the successful completion.

Figure 16B:
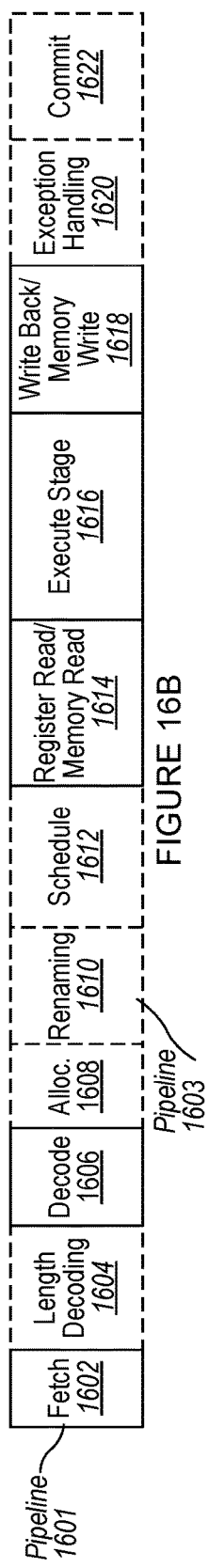
FIG. 16B is a block diagram illustrating an in-order pipeline and a register renaming stage, out-of-order issue/execution pipeline implemented by processor of FIG. 5A that implements enhanced secure paging, according to implementations.
Figure 16A:
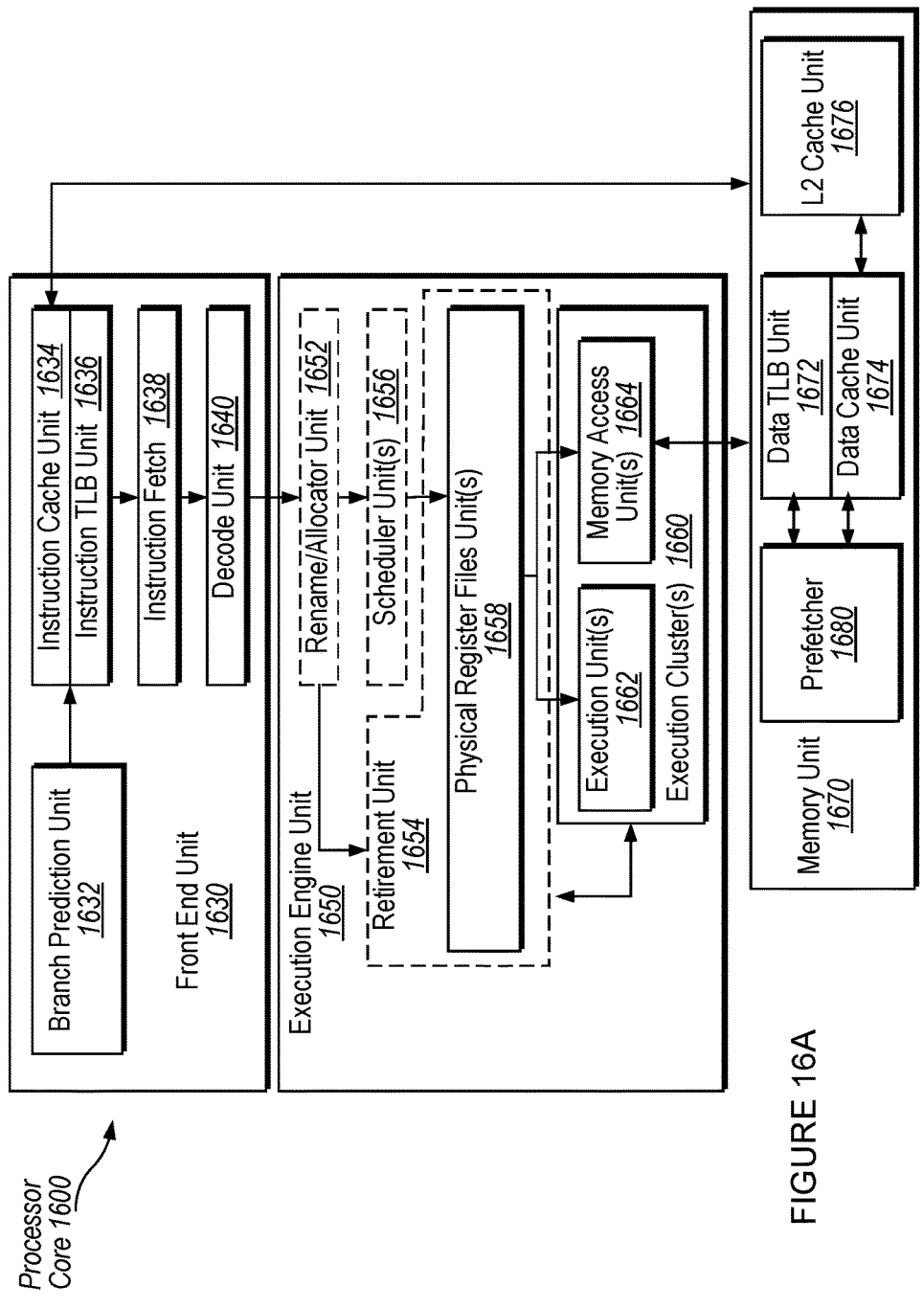
FIG. 16A is a block diagram illustrating a micro-architecture for a processor that that implements enhanced secure paging, according to implementations.

FIG. 16A is a block diagram illustrating a micro-architecture for a processor 1600 that implements enhanced secure paging, according to an implementation. Specifically, processor 1600 depicts an in-order architecture core and a register renaming logic, out-of-order issue/execution logic to be included in a processor according to at least one implementation of the disclosure. In one implementation, process 1600 is the same as processor 100 described with respect to FIG. 1.

Processor 1600 includes a front end unit 1630 coupled to an execution engine unit 1650, and both are coupled to a memory unit 1670. The processor 1600 may include a reduced instruction set computing (RISC) core, a complex instruction set computing (CISC) core, a very long instruction word (VLIW) core, or a hybrid or alternative core type. As yet another option, processor 1600 may include a special-purpose core, such as, for example, a network or communication core, compression engine, graphics core, or the like. In one implementation, processor 1600 may be a multi-core processor or may be part of a multi-processor system.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 1640 may be implemented using various different mechanisms. Examples of suitable mechanisms include, but are not limited to, look-up tables, hardware implementations, programmable logic arrays (PLAs), microcode read only memories (ROMs), etc. The instruction cache unit 1634 is further coupled to the memory unit 1670. The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different scheduler circuits, including reservations stations (RS), central instruction window, etc. The scheduler unit(s) 1656 is coupled to the physical register set(s) unit(s) 1658. Each of the physical register set(s) units 1658 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 1658 is overlapped by the retirement unit 1654 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1654 and the physical register set(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 1656, physical register set(s) unit(s) 1658, and execution cluster(s) 1660 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain implementations are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which may include a data prefetcher 1680, a data TLB unit 1672, a data cache unit (DCU) 1674, and a level 2 (L2) cache unit 1676, to name a few examples. In some implementations DCU 1674 is also known as a first level data cache (L1 cache). The DCU 1674 may handle multiple outstanding cache misses and continue to service incoming stores and loads. It also supports maintaining cache coherency. The data TLB unit 1672 is a cache used to improve virtual address translation speed by mapping virtual and physical address spaces. In one exemplary implementation, the memory access units 1664 may include a load unit, a store address unit, and a store data unit, each of which is coupled to the data TLB unit 1672 in the memory unit 1670. The L2 cache unit 1676 may be coupled to one or more other levels of cache and eventually to a main memory.

In one implementation, the data prefetcher 1680 speculatively loads/prefetches data to the DCU 1674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 1600 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 16B is a block diagram illustrating an in-order pipeline and a register renaming stage, out-of-order issue/execution pipeline implemented by processor 1600 of FIG. 16A that implements hardware support for enhanced secure paging. The solid lined boxes in FIG. 16B illustrate an in-order pipeline 1601, while the dashed lined boxes illustrate a register renaming, out-of-order issue/execution pipeline 1603. In FIG. 16B, the pipelines 1601 and 1603 include a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624. In some implementations, the ordering of stages 1602-1624 may be different than illustrated and are not limited to the specific ordering shown in FIG. 16B.

Figure 17:
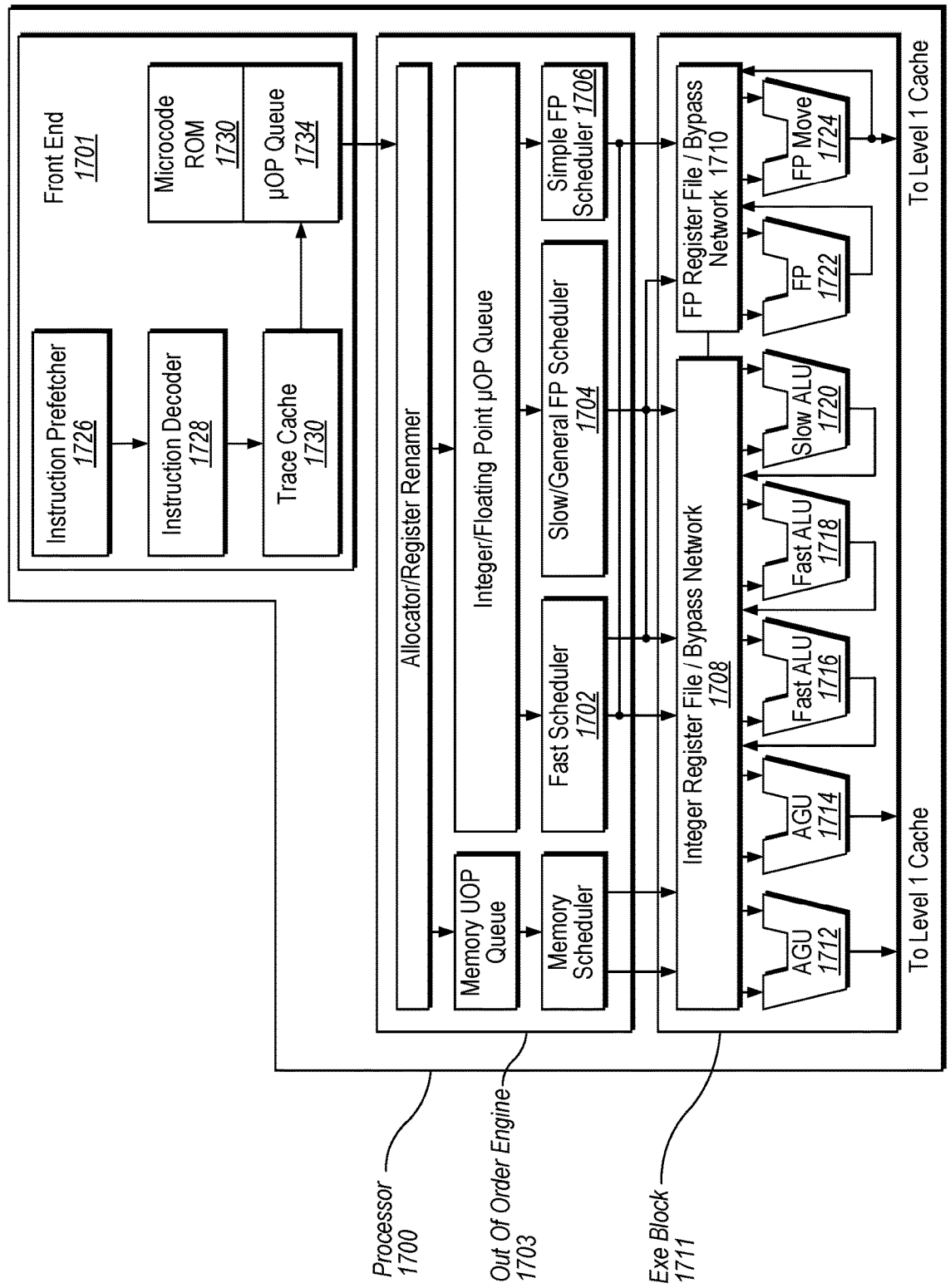
FIG. 17 illustrates a block diagram of the micro-architecture for a processor or an integrated circuit implements enhanced secure paging, according to an implementation.

FIG. 17 illustrates a block diagram of the micro-architecture for a processor 1700 that includes logic circuits of a processor or an integrated circuit that implements enhanced secure paging, according to an implementation. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 1701 is the part of the processor 1700 that fetches instructions to be executed and prepares them to be used later in the processor pipeline. The implementations of the page additions and content copying can be implemented in processor 1700.

The front end 1701 may include several units. In one implementation, the instruction prefetcher 1726 fetches instructions from memory and feeds them to an instruction decoder 1718 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 1730 takes decoded uops and assembles them into program ordered sequences or traces in the uop queue 1734 for execution. When the trace cache 1730 encounters a complex instruction, microcode ROM (or RAM) 1732 provides the uops needed to complete the operation.

Some instructions are converted into a single micro-op, whereas others need several micro-ops to complete the full operation. In one implementation, if more than four micro-ops are needed to complete an instruction, the decoder 1718 accesses the microcode ROM 1732 to do the instruction. For one implementation, an instruction can be decoded into a small number of micro ops for processing at the instruction decoder 1718. In another implementation, an instruction can be stored within the microcode ROM 1732 should a number of micro-ops be needed to accomplish the operation. The trace cache 1730 refers to an entry point programmable logic array (PLA) to determine a correct micro-instruction pointer for reading the micro-code sequences to complete one or more instructions in accordance with one implementation from the micro-code ROM 1732. After the microcode ROM 1732 finishes sequencing micro-ops for an instruction, the front end 1701 of the machine resumes fetching micro-ops from the trace cache 1730.

The out-of-order execution engine 1703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 1702, slow/general floating point scheduler 1704, and simple floating point scheduler 1706. The uop schedulers 1702, 1704, 1706, determine when a uop is ready to execute based on the readiness of their dependent input register operand sources and the availability of the execution resources the uops need to complete their operation. The fast scheduler 1702 of one implementation can schedule on each half of the main clock cycle while the other schedulers can only schedule once per main processor clock cycle. The schedulers arbitrate for the dispatch ports to schedule uops for execution.

Register sets 1708, 1710, sit between the schedulers 1702, 1704, 1706, and the execution units 1712, 1714, 1716, 1718, 1720, 1722, 1724 in the execution block 1711. There is a separate register set 1708, 1710, for integer and floating point operations, respectively. Each register set 1708, 1710, of one implementation also includes a bypass network that can bypass or forward just completed results that have not yet been written into the register set to new dependent uops. The integer register set 1708 and the floating point register set 1710 are also capable of communicating data with the other. For one implementation, the integer register set 1708 is split into two separate register sets, one register set for the low order 32 bits of data and a second register set for the high order 32 bits of data. The floating point register set 1710 of one implementation has 128 bit wide entries because floating point instructions typically have operands from 64 to 128 bits in width.

The execution block 1711 contains the execution units 1712, 1714, 1716, 1718, 1720, 1722, 1724, where the instructions are actually executed. This section includes the register sets 1708, 1710, that store the integer and floating point data operand values that the micro-instructions need to execute. The processor 1700 of one implementation is comprised of a number of execution units: address generation unit (AGU) 1712, AGU 1714, fast ALU 1716, fast ALU 1718, slow ALU 1720, floating point ALU 1712, floating point move unit 1714. For one implementation, the floating point execution blocks 1712, 1714, execute floating point, MMX, SIMD, and SSE, or other operations. The floating point ALU 1712 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 1716, 1718. The fast ALUs 1716, 1718, of one implementation can execute fast operations with an effective latency of half a clock cycle. For one implementation, most complex integer operations go to the slow ALU 1720 as the slow ALU 1720 includes integer execution hardware for long latency type of operations, such as a multiplier, shifts, flag logic, and branch processing. Memory load/store operations are executed by the AGUs 1722, 1724. For one implementation, the integer ALUs 1716, 1718, 1720, are described in the context of performing integer operations on 64 bit data operands. In alternative implementations, the ALUs 1716, 1718, 1720, can be implemented to support a variety of data bits including 16, 32, 128, 256, etc. Similarly, the floating point units 1722, 1724, can be implemented to support a range of operands having bits of various widths. For one implementation, the floating point units 1722, 1724, can operate on 128 bits wide packed data operands in conjunction with SIMD and multimedia instructions.

In one implementation, the uops schedulers 1702, 1704, 1706, dispatch dependent operations before the parent load has finished executing. As uops are speculatively scheduled and executed in processor 1700, the processor 1700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 18:
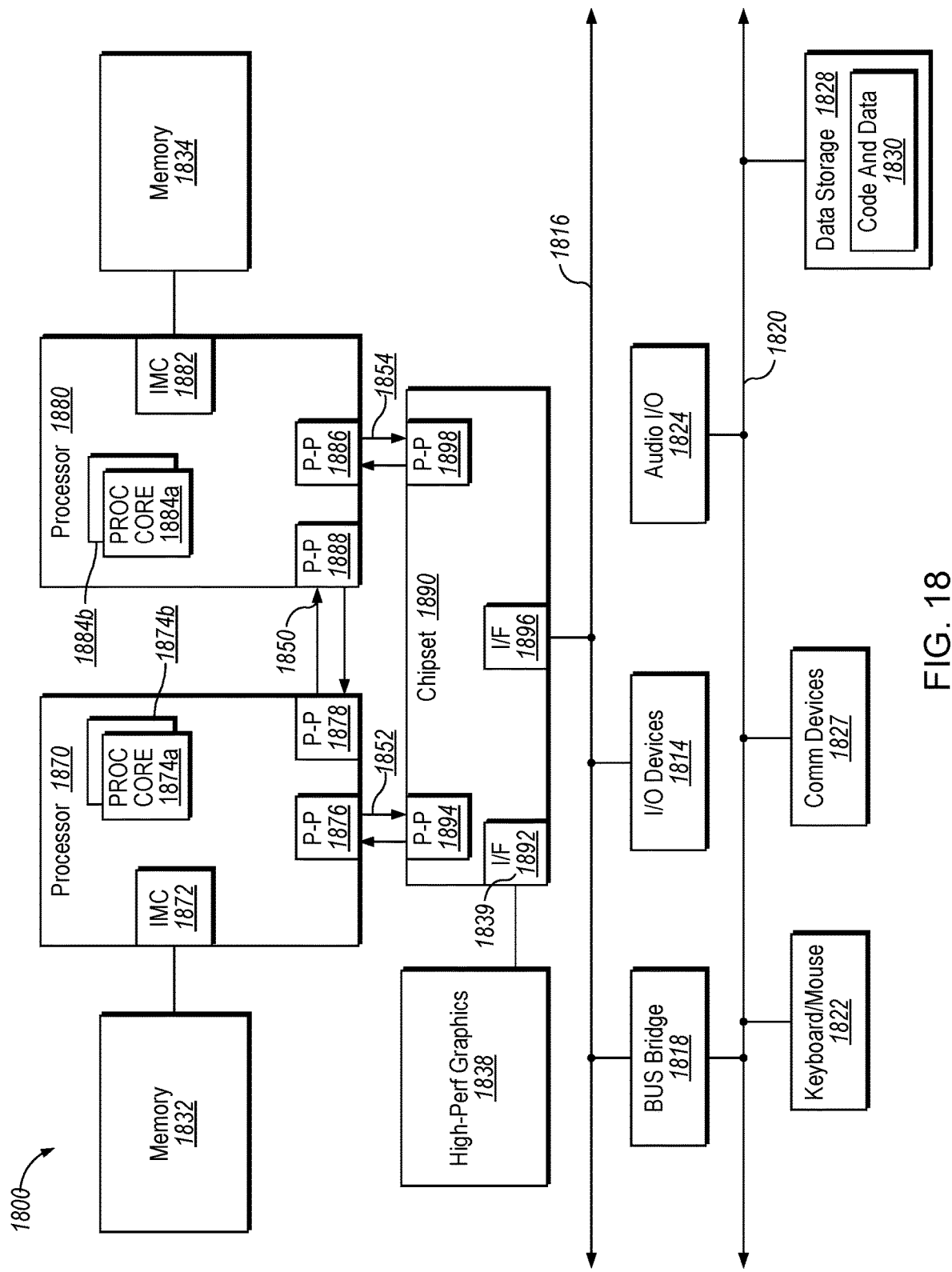
FIG. 18 is a block diagram of a computer system that implements hardware support for enhanced secure paging, according to one implementation.

Implementations may be embodied in many different system types. Referring now to FIG. 18, shown is a block diagram of a multiprocessor system 1800 that implements hardware support for enhanced secure paging, in accordance with an implementation. As shown in FIG. 18, multiprocessor system 1800 is a point-to-point interconnect system, and includes a first processor 1870 and a second processor 1880 coupled via a point-to-point interconnect 1850. As shown in FIG. 18, each of processors 1870 and 1880 may be multicore processors, including first and second processor cores (i.e., processor cores 1874a and 1874b and processor cores 1884a and 1884b), although potentially many more cores may be present in the processors. While shown with two processors 1870, 1880, it is to be understood that the scope of the disclosure is not so limited. In other implementations, one or more additional processors may be present in a given processor.

Processors 1870 and 1880 are shown including integrated memory controller units 1872 and 1882, respectively. Processor 1870 also includes as part of its bus controller units point-to-point (P-P) interfaces 1876 and 1888; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may exchange information with a chipset 1890 via individual P-P interfaces 1852, 1854 using point to point interface circuits 1876, 1894, 1886, 1898. Chipset 1890 may also exchange information with a high-performance graphics circuit 1838 via a high-performance graphics interface 1839.

Chipset 1890 may be coupled to a first bus 1816 via an interface 1896. In one implementation, first bus 1816 may be a Peripheral Component Interconnect (PCI) bus, or a bus such as a PCI Express bus or interconnect bus, although the scope of the disclosure is not so limited.

Figure 19:
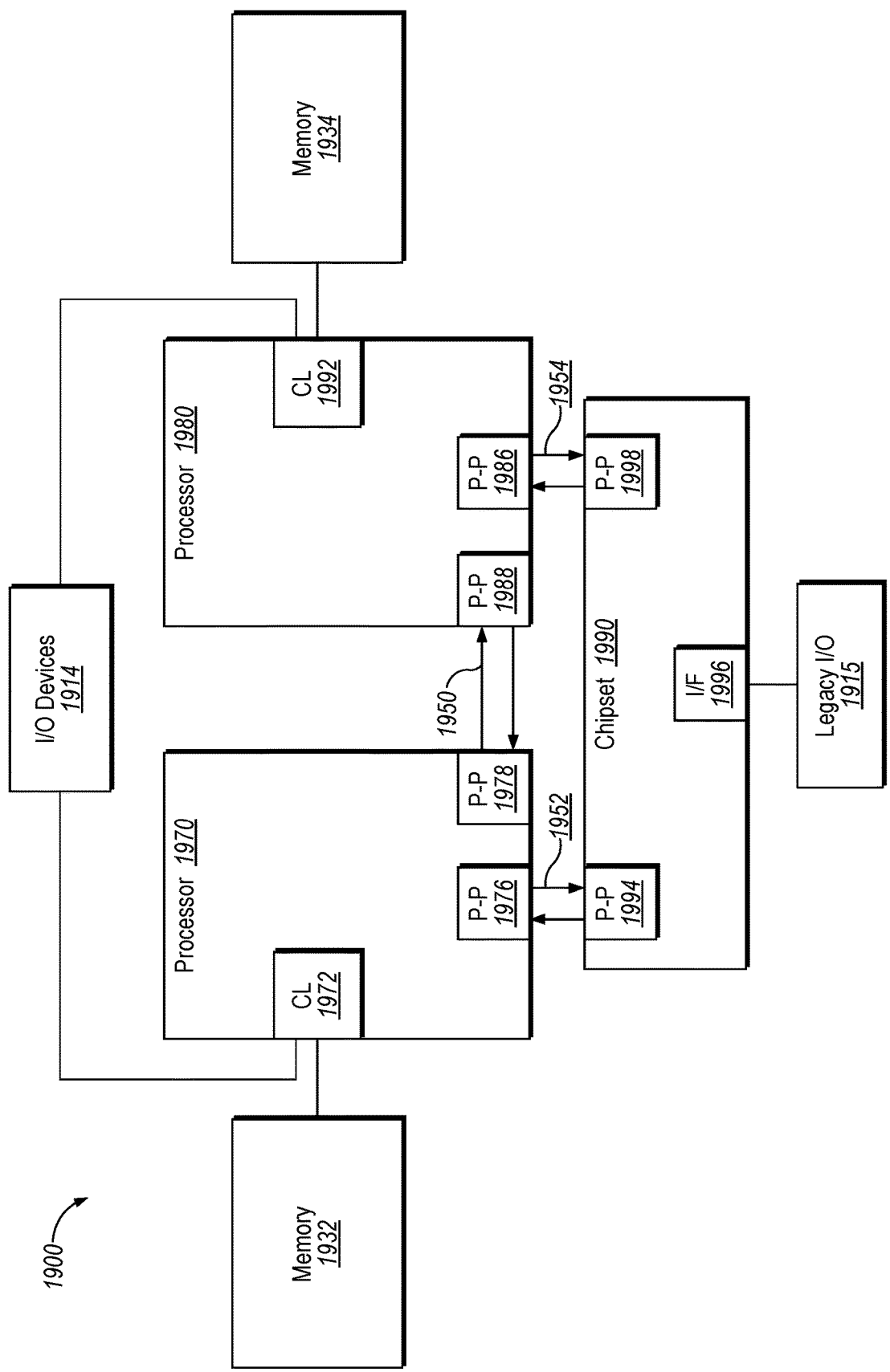
FIG. 19 is a block diagram of a computer system that implements hardware support for enhanced secure paging, according to another implementation.

Referring now to FIG. 19, shown is a block diagram of a third system 1900 that implements hardware support for enhanced secure paging, in accordance with an implementation of the disclosure. Like elements in FIGS. 18 and 19 bear like reference numerals and certain aspects of FIG. 19 have been omitted from FIG. 18 in order to avoid obscuring other aspects of FIG. 19.

FIG. 19 illustrates that the processors 1970, 1980 may include integrated memory and I/O control logic ("CL") 1972 and 1992, respectively. For at least one implementation, the CL 1972, 1982 may include integrated memory controller units such as described herein. In addition. CL 1972, 1992 may also include I/O control logic. FIG. 19 illustrates that the memories 1932, 1934 are coupled to the CL 1972, 1992, and that I/O devices 1914 are also coupled to the control logic 1972, 1992. Legacy I/O devices 1915 are coupled to the chipset 1990.

Figure 20:
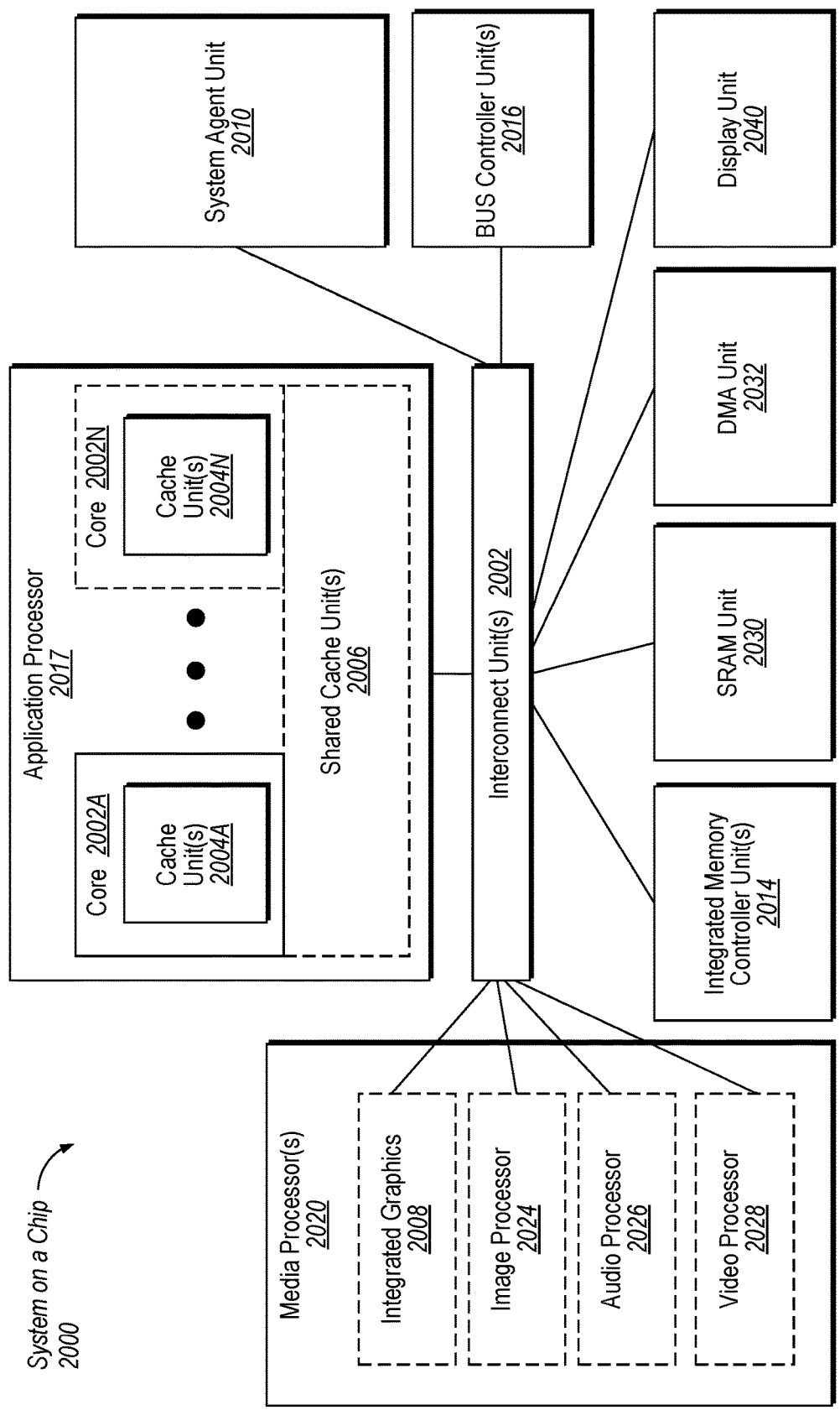
FIG. 20 is a block diagram of a system-on-a-chip that implements enhanced secure paging, according to one implementation.
Figure 21:
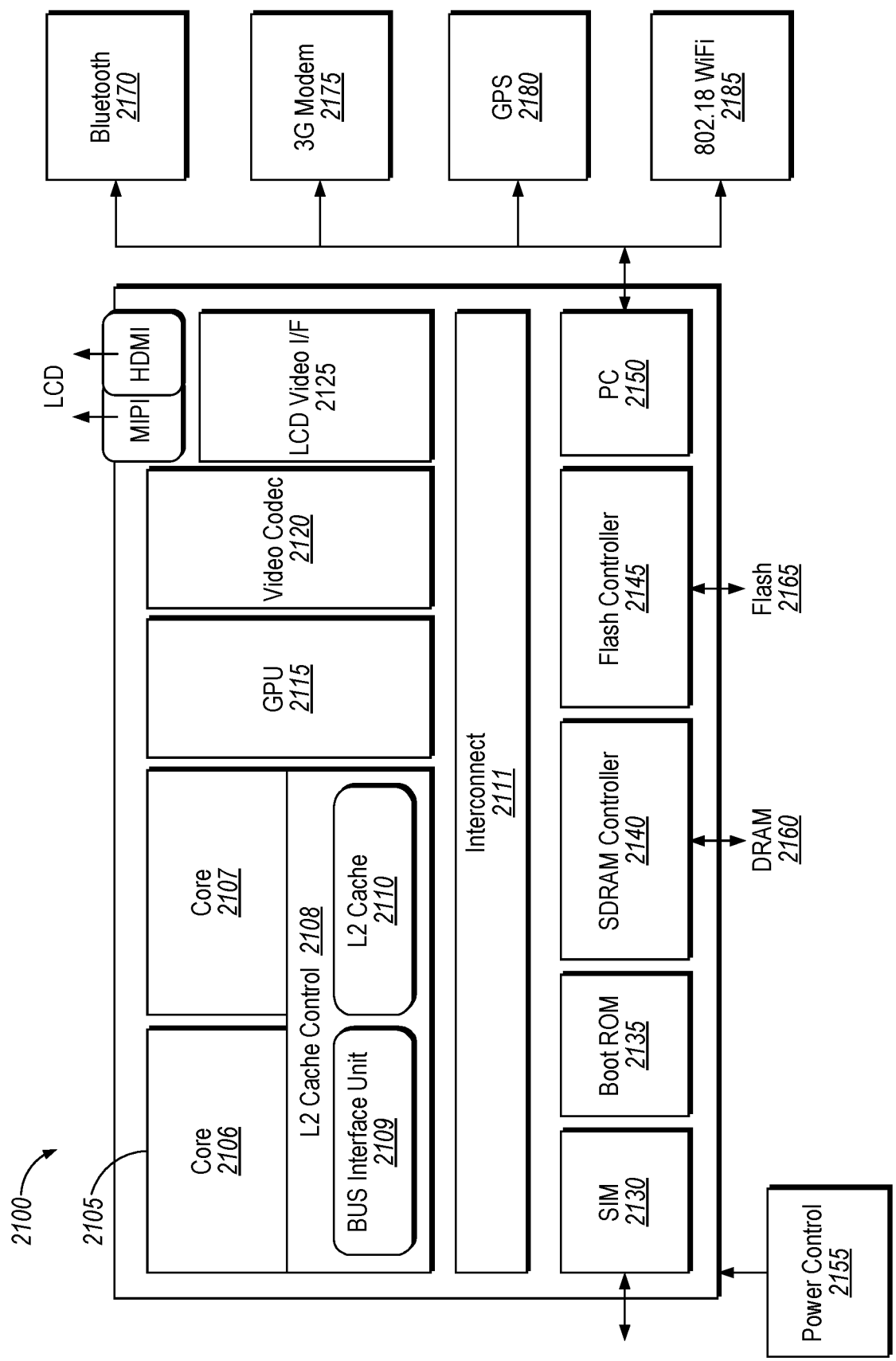
FIG. 21 illustrates a block diagram for a computing system that implements enhanced secure paging, according to one implementation.

FIG. 20 is an exemplary system on a chip (SoC) 2000 that implements hardware support for enhanced secure paging, according to one implementation. The SoC 2000 may include one or more of the cores 2002A . . . 2002N. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 2000 of FIG. 20, dashed lined boxes are features on more advanced SoCs. An interconnect unit(s) 2002 may be coupled to: an application processor 2017 which includes a set of one or more cores 2002A-N and shared cache unit(s) 2006; a system agent unit 2010; a bus controller unit(s) 2016; an integrated memory controller unit(s) 2014; a set of one or more media processors 2020 which may include integrated graphics logic 2008, an image processor 2024 for providing still and/or video camera functionality, an audio processor 2026 for providing hardware audio acceleration, and a video processor 2028 for providing video encode/decode acceleration; a static random access memory (SRAM) unit 2030; a direct memory access (DMA) unit 2032; and a display unit 2040 for coupling to one or more external displays.

Turning next to FIG. 10, an implementation of a system on-chip (SoC) design that implements hardware support for enhanced secure paging, in accordance with implementations of the disclosure. As an illustrative example, SoC 1000 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1000.

Here, SoC 2100 includes 2 cores—2106 and 2107. Similar to the discussion above, cores 2106 and 2107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 2106 and 2107 are coupled to cache control 2108 that is associated with bus interface unit 2109 and L2 cache 2110 to communicate with other parts of system 2100. Interconnect 2111 includes an on-chip interconnect, such as an IOSF, AMBA, or other interconnects discussed above, which can implement one or more aspects of the described disclosure.

In one implementation, SDRAM controller 2140 may connect to interconnect 2111 via cache 2110. Interconnect 2111 provides communication channels to the other components, such as a Subscriber Identity Module (SIM) 2130 to interface with a SIM card, a boot ROM 2135 to hold boot code for execution by cores 2106 and 2107 to initialize and boot SoC 2100, a SDRAM controller 2140 to interface with external memory (e.g. DRAM 2160), a flash controller 2145 to interface with non-volatile memory (e.g. Flash 2165), a peripheral control 2150 (e.g. Serial Peripheral Interface) to interface with peripherals, video codecs 2120 and Video interface 2125 to display and receive input (e.g. touch enabled input), GPU 2115 to perform graphics related computations, etc. Any of these interfaces may incorporate aspects of the implementations described herein.

In addition, the system illustrates peripherals for communication, such as a Bluetooth® module 2170, 3G modem 2175, GPS 2180, and Wi-Fi® 2185. Note as stated above, a UE includes a radio for communication. As a result, these peripheral communication modules may not all be included. However, in a UE some form of a radio for external communication should be included.

Figure 22:
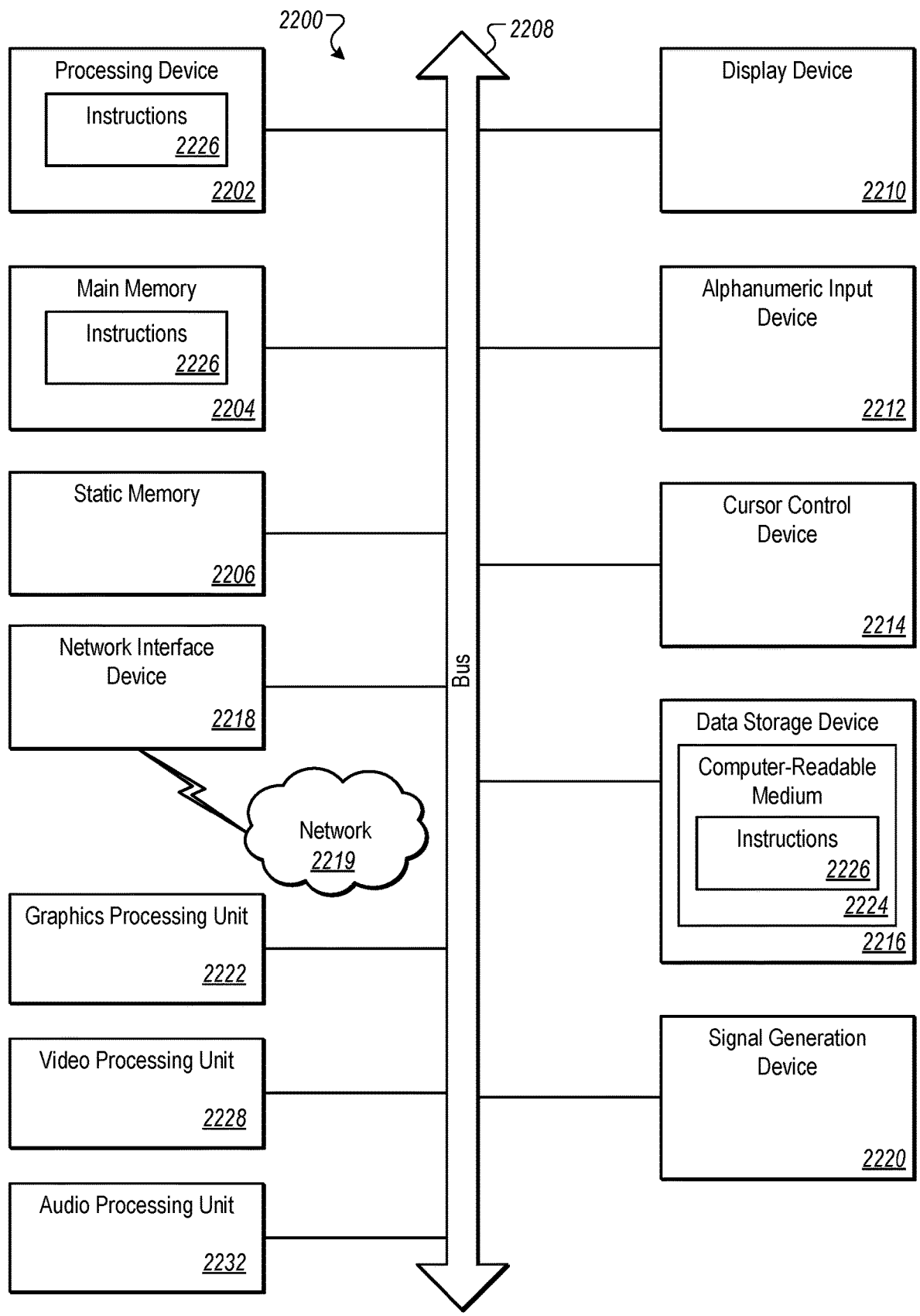
FIG. 22 illustrates a block diagram for a computing system that implements hardware support for enhanced secure paging, according to another implementation.

FIG. 22 illustrates a diagrammatic representation of a machine in the example form of a computing system 2200 within which a set of instructions, for causing the machine to perform any one or more of the methodologies discussed herein, may be executed. The one or more methodologies may include those that implement hardware support for enhanced secure paging, according to one implementation. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 2200.

The computing system 2200 includes a processing device 2202, main memory 2204 (e.g., flash memory, dynamic random access memory (DRAM) (such as synchronous DRAM (SDRAM) or DRAM (RDRAM), etc.), a static memory 2206 (e.g., flash memory, static random access memory (SRAM), etc.), and a data storage device 2216, which communicate with each other via a bus 2208.

Processing device 2202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 2202 may also be one or more special-purpose processing devices such as an application-specific integrated circuit (ASIC), a field programmable gate array (FPGA), a digital signal processor (DSP), network processor, or the like. In one implementation, processing device 2202 may include one or more processor cores. The processing device 2202 is configured to execute the processing logic 2226 for performing the operations discussed herein.

In one implementation, processing device 2202 can be part of a processor or an integrated circuit that includes the disclosed LLC caching architecture. Alternatively, the computing system 2200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 2200 may further include a network interface device 2218 communicably coupled to a network 2219. The computing system 2200 also may include a video display device 2210 (e.g., a liquid crystal display (LCD) or a cathode ray tube (CRT)), an alphanumeric input device 2212 (e.g., a keyboard), a cursor control device 2214 (e.g., a mouse), a signal generation device 2220 (e.g., a speaker), or other peripheral devices. Furthermore, computing system 2200 may include a graphics processing unit 2222, a video processing unit 2228 and an audio processing unit 2232. In another implementation, the computing system 2200 may include a chipset (not illustrated), which refers to a group of integrated circuits, or chips, that are designed to work with the processing device 2202 and controls communications between the processing device 2202 and external devices. For example, the chipset may be a set of chips on a motherboard that links the processing device 2202 to very high-speed devices, such as main memory 2204 and graphic controllers, as well as linking the processing device 2202 to lower-speed peripheral buses of peripherals, such as USB, PCI or ISA buses.

The data storage device 2216 may include a computer-readable storage medium 2224 on which is stored software 2226 embodying any one or more of the methodologies of functions described herein. The software 2226 may also reside, completely or at least partially, within the main memory 2204 as instructions 2226 and/or within the processing device 2202 as processing logic during execution thereof by the computing system 2200; the main memory 2204 and the processing device 2202 also constituting computer-readable storage media.

The computer-readable storage medium 2224 may also be used to store instructions 2226 utilizing the processing device 2202, and/or a software library containing methods that call the above applications. While the computer-readable storage medium 2224 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is a processor comprising: 1) a secure enclave circuit comprising a secure storage structure to store an enclave page cache map, wherein the enclave page cache map is to track contents of a secure enclave within system memory, the secure enclave to store secure data comprising a page having a virtual address; and 2) an execution unit operatively coupled to the secure enclave circuit, wherein the execution unit is to, in response to a request to evict the page from the secure enclave, execute a plurality of decoded instructions to: a) block creation of translations of the virtual address; c) record one or more hardware threads currently accessing the secure data in the secure enclave; d) send an inter-processor interrupt to one or more cores associated with the one or more hardware threads, to cause the one or more hardware threads to exit the secure enclave and to flush translation lookaside buffers of the one or more cores; and e) in response to detection of a page fault associated with the virtual address for the page in the secure enclave, unblock the creation of further translations of the virtual address.

In Example 2, the processor of Example 1, wherein the execution unit is further to detect the page fault associated with the page before the execution unit is to execute a write-back instruction to write the page back to disk.

In Example 3, the processor of Example 1, wherein, to block creation of the further translations of the virtual address, the execution unit is further to execute the plurality of decoded instructions to: a) mark the page as not present in a plurality of translation page tables; b) detect passage of a period of time during which the page is not accessed; and c) set a bit in the enclave page cache map for the page mapped to the virtual address, to block creation of further translations of the virtual address for access to the page.

In Example 4, the processer of Example 3, wherein, to unblock the creation of translations of the virtual address, the execution unit is to execute a decoded unblock instruction to: a) clear the bit in the enclave page cache map for the page mapped to the virtual address; and b) mark the page as present in the plurality of translation tables.

In Example 5, the processor of Example 1, wherein to unblock the creation of translations of the virtual address, the execution unit is to execute a decoded unblock instruction to: a) verify there is no resource conflict associated with access to the page in the secure enclave; b) read, from a first input register, the virtual address for the page in the secure enclave; c) translate the virtual address to a guest physical address and the guest physical address to a host physical address; and d) verify, via an access to the enclave page cache map, that the host physical address of the page is associated with the secure enclave in the system memory.

In Example 6, the processor of Example 5, wherein the execution unit is further to execute the decoded unblock instruction to: a) determine a host physical address of a secure enclave control structure (SECS) associated with the secure enclave via reference to an entry in the enclave page cache map for the page; b) access, using the host physical address of the SECS, an epoch tracking structure for the secure enclave; c) read, from the epoch tracking structure, a previous epoch value and a previous epoch counter value into a set of local epoch registers; d) verify, based on the previous epoch value and the previous epoch counter value, that the one or more hardware threads have exited the secure enclave; and e) clear the previous epoch value associated with the secure enclave.

In Example 7, the processor of Example 6, wherein clearance of the previous epoch value associated with the secure enclave is performed before clearance of a blocked bit in the enclave page cache map for the virtual address.

Various implementations may have different combinations of the structural features described above. For instance, all optional features of the processors and methods described above may also be implemented with respect to a system described herein and specifics in the examples may be used anywhere in one or more implementations.

Example 8 is a system comprising: 1) a plurality of processor cores, each comprising a translation lookaside buffer (TLB); 2) a secure enclave circuit comprising a secure storage structure to store an enclave page cache map, wherein the enclave page cache map is to track contents of a secure enclave within system memory, the secure enclave to store secure data comprising a page having a virtual address; and 3) an execution unit operatively coupled to the secure enclave circuit and the plurality of processor cores, wherein the execution unit is to, in response to a request to evict the page from the secure enclave, execute a plurality of decoded instructions to: a) block creation of translations of the virtual address; b) record one or more hardware threads currently accessing the secure data in the secure enclave; c) send an inter-processor interrupt to one or more of the plurality of processor cores associated with the one or more hardware threads, to cause the one or more hardware threads to exit the secure enclave and to flush the TLB of the one or more of the plurality of processor cores; and d) in response to detection of a page fault associated with the virtual address for the page in the secure enclave, unblock creation of further translations of the virtual address.

In Example 9, the system of Example 8, wherein the execution unit is further to detect the page fault associated with the page before the execution unit is to execute a write-back instruction to write the page back to disk.

In Example 10, the system of Example 8, wherein, to block creation of the translations of the virtual address, the execution unit is further to execute the plurality of decoded instructions to: a) mark the page as not present in a plurality of translation page tables; b) detect passage of a period of time during which the page is not accessed; and c) set a bit in the enclave page cache map for the page mapped to the virtual address, to block creation of further translations of the virtual address for access to the page.

In Example 11, the system of Example 10, wherein, to unblock the creation of translations of the virtual address, the execution unit is to execute a decoded unblock instruction to: a) clear the bit in the enclave page cache map for the page mapped to the virtual address; and b) mark the page as present in the plurality of translation tables.

In Example 12, the system of Example 8, wherein to unblock the creation of translations of the virtual address, the execution unit is to execute a decoded unblock instruction to: a) verify there is no resource conflict associated with access to the page in the secure enclave; b) read, from a first input register, the virtual address for the page in the secure enclave; c) translate the virtual address to a guest physical address and the guest physical address to a host physical address; and d) verify, via an access to the enclave page cache map, that the host physical address of the page is associated with the secure enclave in the system memory.

In Example 13, the system of Example 12, wherein the execution unit is further to execute the decoded unlock instruction to: a) determine a host physical address of a secure enclave control structure (SECS) associated with the secure enclave via reference to an entry in the enclave page cache map for the page; b) access, using the host physical address of the SECS, an epoch tracking structure for the secure enclave; c) read, from the epoch tracking structure, a previous epoch value and a previous epoch counter value into a set of local epoch registers; d) verify, based on the previous epoch value and the previous epoch counter value, that the one or more hardware threads have exited the secure enclave; and e) clear the previous epoch value associated with the secure enclave.

In Example 14, the system of Example 13, wherein clearance of the previous epoch value associated with the secure enclave is performed before clearance of a blocked bit in the enclave page cache map for the virtual address.

Various implementations may have different combinations of the structural features described above. For instance, all optional features of the processors and methods described above may also be implemented with respect to a system described herein and specifics in the examples may be used anywhere in one or more implementations Example 15 is a method comprising: 1) storing, in a secure enclave of main memory of a computing system, secure data comprising a page having a virtual address; 2) storing, in a secure storage structure of a secure enclave circuit of the computing system, an enclave page cache map to track contents of the secure enclave within the system memory; and in response to a request to evict the page from the secure enclave: 3) blocking creation of translations of the virtual address; 4) recording one or more hardware threads currently accessing the secure data in the secure enclave; 5) sending an inter-processor interrupt to one or more cores associated with the one or more hardware threads, to cause the one or more hardware threads to exit the secure enclave and to flush translation lookaside buffers of the one or more cores; and 6) in response to detecting a page fault associated with the virtual address for the page in the secure enclave, unblocking creation of translations of the virtual address.

In Example 16, the method of Example 15, further comprising detecting the page fault associated with the page before executing a write-back instruction to write the page back to disk.

In Example 17, the method of Example 15, wherein blocking the creation of translations of the virtual address comprises: 1) marking the page as not present in a plurality of translation page tables; 2) detecting passage of a period of time during which the page is not accessed; and 3) setting a bit in the enclave page cache map for the page mapped to the virtual address, to block creation of translations of the virtual address for access to the page.

In Example 18, the method of Example 17, wherein unblocking the creation of translations of the virtual address comprises: 1) clearing the bit in the enclave page cache map for the page mapped to the virtual address; and 2) marking the page as present in the plurality of translation tables.

In Example 19, the method of Example 15, wherein unblocking the creation of translations of the virtual address comprises: 1) verifying there is no resource conflict associated with access to the page in the secure enclave; 2) reading, from a first input register, the virtual address for the page in the secure enclave; 3) translating the virtual address to a guest physical address and the guest physical address to a host physical address; and 4) verifying, via an access to the enclave page cache map, that the host physical address of the page is associated with the secure enclave in the system memory.

In Example 20, the method of Example 19, further comprising: 1) determining a host physical address of a secure enclave control structure (SECS) associated with the secure enclave via reference to an entry in the enclave page cache map for the page; 2) accessing, using the host physical address of the SECS, an epoch tracking structure for the secure enclave; 3) reading, from the epoch tracking structure, a previous epoch value and a previous epoch counter value into a set of local epoch registers; 4) verifying, based on the previous epoch value and the previous epoch counter value, that the one or more hardware threads have exited the secure enclave; and 5) clearing the previous epoch value associated with the secure enclave before clearance of a blocked bit in the enclave page cache map for the virtual address.

Various implementations may have different combinations of the structural features described above. For instance, all optional features of the processors and methods described above may also be implemented with respect to a system described herein and specifics in the examples may be used anywhere in one or more implementations.

Example 21 is a processor comprising: 1) a secure enclave circuit comprising a secure storage structure to store an enclave page cache map (EPCM), wherein the EPCM is to track contents of a secure enclave within system memory, the secure enclave to store secure data comprising a page at a virtual address, and wherein the EPCM is to store a first blocked bit to indicate whether the page is blocked; and 2) a processor core operatively coupled to the secure enclave circuit, the processor core to execute a virtual machine monitor (VMM) to manage paging within the secure enclave for a virtual machine (VM), wherein to evict the page from the secure enclave, the VMM is to: a) set the first blocked bit in the EPCM to indicate the page is blocked from further translation of the virtual address for access to the page; b) generate a block state bit, indicative of a state of the first blocked bit, to set a second blocked bit within a first field of an information data structure stored in the system memory; c) execute a write-back instruction to copy a value of the second blocked bit into a blocked bit flag of a unified metadata structure (UMDS), wherein the UMDS is to be stored in a version array page of the secure enclave; and d) remove the page from the secure enclave to one of the system memory, outside of the secure enclave, or to disk.

In Example 22, the processor of Example 21, wherein the information data structure further comprises a second field to hold a USE_UMDS bit, wherein to restore the page from the one of the system memory or the disk to which the page was written during execution of the write-back instruction, the VMM is to execute a load instruction to: a) access, within an input register, an address of a location of the information data structure; b) verify that the USE_UMDS bit is set; and 3) load the first blocked bit of the EPCM with a value of the blocked bit flag that is read from the UMDS.

In Example 23, the processor of Example 21, wherein the information data structure further comprises a second field to hold a USE_UMDS bit, wherein to restore the page from the one of the system memory or the disk to which the page was written during execution of the write-back instruction, the VMM is to execute a load instruction to: a) access, within an input register, an address of a location of the information data structure; b) verify that the USE_UMDS bit is cleared; and c) load the first blocked bit of the EPCM with a value of the second blocked bit that is read from the information data structure.

In Example 24, the processor of Example 21, wherein the VMM is further to: a) access, in a first input register, a first pointer to the virtual address of the page in the secure enclave; b) access, in a second input register, a second pointer to the version array page in the secure enclave; c) access, in a third input register, a third pointer to a memory location outside of the secure enclave to which to save the page; d) generate a message authentication code (MAC) of the page with use of a version number; e) encrypt data for the page with use of a secret key, to generate encrypted data for the page; f) populate the UMDS, stored within the version array page, with the version number and the MAC; g) write the encrypted data to the memory location outside of the secure enclave; h) write, to the UMDS, paging crypto metadata for the page; and i) remove the page from the secure enclave back to the disk.

In Example 25, the processor of Example 24, wherein to restore the page, the VMM is to execute a load instruction to: a) access, in a first output register, a fourth pointer to the encrypted page at the memory location; b) access, in a fourth input register, a fifth pointer to a free page location in the secure enclave; c) access, in the second input register, the second pointer to a virtual address of a version array slot in the secure enclave; d) translate the virtual address to a guest physical address, and the guest physical address to a host physical address for the version array page; e) access the UMDS within the version array page at the host physical address of the version array slot; f) verify the encrypted page using the MAC and the version number; g) decrypt the encrypted data, to generate decrypted data for the page; h) store the decrypted data in the secure enclave at the free page location; and i) clear a slot within the UMDS for a next version value.

Various implementations may have different combinations of the structural features described above. For instance, all optional features of the processors and methods described above may also be implemented with respect to a system described herein and specifics in the examples may be used anywhere in one or more implementations.

Example 26 is a non-transitory computer-readable storage medium to store instructions, which when executed by a processor, are to perform a plurality of operations comprising: 1) storing, in a secure enclave of main memory of a computing system, secure data comprising a page having a virtual address; 2) storing, in a secure storage structure of a secure enclave circuit of the computing system, an enclave page cache map to track contents of the secure enclave within the system memory; and 3) in response to a request to evict the page from the secure enclave: a) blocking creation of translations of the virtual address; b) recording one or more hardware threads currently accessing the secure data in the secure enclave; c) sending an inter-processor interrupt to one or more cores associated with the one or more hardware threads, to cause the one or more hardware threads to exit the secure enclave and to flush translation lookaside buffers of the one or more cores; and d) in response to detecting a page fault associated with the virtual address for the page in the secure enclave, unblocking creation of translations of the virtual address.

In Example 27, the non-transitory computer-readable storage medium of Example 26, wherein the plurality of operations further comprise detecting the page fault associated with the page before executing a write-back instruction to write the page back to disk.

In Example 28, the non-transitory computer-readable storage medium of Example 26, wherein blocking the creation of translations of the virtual address comprises: 1) marking the page as not present in a plurality of translation page tables; 2) detecting passage of a period of time during which the page is not accessed; and 3) setting a bit in the enclave page cache map for the page mapped to the virtual address, to block creation of translations of the virtual address for access to the page.

In Example 29, the non-transitory computer-readable storage medium of Example 28, wherein unblocking the creation of translations of the virtual address comprises: 1) clearing the bit in the enclave page cache map for the page mapped to the virtual address; and 2) marking the page as present in the plurality of translation tables.

In Example 30, the non-transitory computer-readable storage medium of Example 26, wherein unblocking the creation of translations of the virtual address comprises: 1) verifying there is no resource conflict associated with access to the page in the secure enclave; 2) reading, from a first input register, the virtual address for the page in the secure enclave; 3) translating the virtual address to a guest physical address and the guest physical address to a host physical address; and 4) verifying, via an access to the enclave page cache map, that the host physical address of the page is associated with the secure enclave in the system memory.

In Example 31, the non-transitory computer-readable storage medium of Example 30, wherein the plurality of operations further comprises: 1) determining a host physical address of a secure enclave control structure (SECS) associated with the secure enclave via reference to an entry in the enclave page cache map for the page; 2) accessing, using the host physical address of the SECS, an epoch tracking structure for the secure enclave; 3) reading, from the epoch tracking structure, a previous epoch value and a previous epoch counter value into a set of local epoch registers; 4) verifying, based on the previous epoch value and the previous epoch counter value, that the one or more hardware threads have exited the secure enclave; and 5) clearing the previous epoch value associated with the secure enclave before clearance of a blocked bit in the enclave page cache map for the virtual address.

Various implementations may have different combinations of the structural features described above. For instance, all optional features of the processors and methods described above may also be implemented with respect to a system described herein and specifics in the examples may be used anywhere in one or more implementations.

Example 32 is an apparatus comprising: 1) means for storing, in a secure enclave of main memory of a computing system, secure data comprising a page having a virtual address; 2) means for storing, in a secure storage structure of a secure enclave circuit of the computing system, an enclave page cache map to track contents of the secure enclave within the system memory; and in response to a request to evict the page from the secure enclave: 3) means for blocking creation of translations of the virtual address; 4) means for recording one or more hardware threads currently accessing the secure data in the secure enclave; 5) means for sending an inter-processor interrupt to one or more cores associated with the one or more hardware threads, to cause the one or more hardware threads to exit the secure enclave and to flush translation lookaside buffers of the one or more cores; and 6) in response to detecting a page fault associated with the virtual address for the page in the secure enclave, means for unblocking creation of translations of the virtual address.

In Example 33, the apparatus of Example 32, further comprising means for detecting the page fault associated with the page before executing a write-back instruction to write the page back to disk.

In Example 34, the apparatus of Example 32, wherein the means for blocking the creation of translations of the virtual address comprises: 1) means for marking the page as not present in a plurality of translation page tables; 2) means for detecting passage of a period of time during which the page is not accessed; and 3) means for setting a bit in the enclave page cache map for the page mapped to the virtual address, to block creation of translations of the virtual address for access to the page.

In Example 35, the apparatus of Example 34, wherein the means for unblocking the creation of translations of the virtual address comprises: 1) means for clearing the bit in the enclave page cache map for the page mapped to the virtual address; and 2) means for marking the page as present in the plurality of translation tables.

In Example 36, the apparatus of Example 32, wherein the means for unblocking the creation of translations of the virtual address comprises: 1) means for verifying there is no resource conflict associated with access to the page in the secure enclave; 2) means for reading, from a first input register, the virtual address for the page in the secure enclave; 3) means for translating the virtual address to a guest physical address and the guest physical address to a host physical address; and 4) means for verifying, via an access to the enclave page cache map, that the host physical address of the page is associated with the secure enclave in the system memory.

In Example 37, the apparatus of Example 36, further comprising: 1) means for determining a host physical address of a secure enclave control structure (SECS) associated with the secure enclave via reference to an entry in the enclave page cache map for the page; 2) means for accessing, using the host physical address of the SECS, an epoch tracking structure for the secure enclave; 3) means for reading, from the epoch tracking structure, a previous epoch value and a previous epoch counter value into a set of local epoch registers; 4) means for verifying, based on the previous epoch value and the previous epoch counter value, that the one or more hardware threads have exited the secure enclave; and 5) means for clearing the previous epoch value associated with the secure enclave before clearance of a blocked bit in the enclave page cache map for the virtual address.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' capable to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively.

For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
a secure enclave circuit comprising a secure storage structure to store an enclave page cache map, wherein the enclave page cache map is to track contents of a secure enclave within system memory, the secure enclave to store secure data comprising a page having a virtual address; and an execution unit operatively coupled to the secure enclave circuit, wherein the execution unit is to, in response to a request to evict the page from the secure enclave, execute a plurality of decoded instructions to:

block creation of translations of the virtual address;

record one or more hardware threads currently accessing the secure data in the secure enclave;

send an inter-processor interrupt to one or more cores associated with the one or more hardware threads, to cause the one or more hardware threads to exit the secure enclave and to flush translation lookaside buffers of the one or more cores;

detect a page fault associated with the page before execution of a write-back instruction to write the page back to disk; and in response to detection of the page fault associated with the virtual address for the page in the secure enclave, unblock creation of further translations of the virtual address.

2. The processor of claim 1, wherein, to block creation of the translations of the virtual address, the execution unit is further to execute the plurality of decoded instructions to:

mark the page as not present in a plurality of translation page tables;

detect passage of a period of time during which the page is not accessed; and set a bit in the enclave page cache map for the page mapped to the virtual address, to block creation of further translations of the virtual address for access to the page.

3. The processor of claim 2, wherein, to unblock the creation of translations of the virtual address, the execution unit is to execute a decoded unblock instruction to:

clear the bit in the enclave page cache map for the page mapped to the virtual address; and mark the page as present in the plurality of translation page tables.

4. The processor of claim 1, wherein to unblock the creation of translations of the virtual address, the execution unit is to execute a decoded unblock instruction to:

verify there is no resource conflict associated with access to the page in the secure enclave;

read, from a first input register, the virtual address for the page in the secure enclave;

translate the virtual address to a guest physical address and the guest physical address to a host physical address; and verify, via an access to the enclave page cache map, that the host physical address of the page is associated with the secure enclave in the system memory.

5. The processor of claim 4, wherein the execution unit is further to execute the decoded unblock instruction to:

determine a host physical address of a secure enclave control structure (SECS) associated with the secure enclave via reference to an entry in the enclave page cache map for the page;

access, using the host physical address of the SECS, an epoch tracking structure for the secure enclave;

read, from the epoch tracking structure, a previous epoch value and a previous epoch counter value into a set of local epoch registers;

verify, based on the previous epoch value and the previous epoch counter value, that the one or more hardware threads have exited the secure enclave; and clear the previous epoch value associated with the secure enclave.

6. The processor of claim 5, wherein clearance of the previous epoch value associated with the secure enclave is performed before clearance of a blocked bit in the enclave page cache map for the virtual address.

7. A system comprising:

a plurality of processor cores, each comprising a translation lookaside buffer (TLB);

a secure enclave circuit comprising a secure storage structure to store an enclave page cache map, wherein the enclave page cache map is to track contents of a secure enclave within system memory, the secure enclave to store secure data comprising a page having a virtual address; and an execution unit operatively coupled to the secure enclave circuit and the plurality of processor cores, wherein the execution unit is to, in response to a request to evict the page from the secure enclave, execute a plurality of decoded instructions to:

block creation of translations of the virtual address;

record one or more hardware threads currently accessing the secure data in the secure enclave;

send an inter-processor interrupt to one or more of the plurality of processor cores associated with the one or more hardware threads, to cause the one or more hardware threads to exit the secure enclave and to flush the TLB of the one or more of the plurality of processor cores;

detect a page fault associated with the page before execution of a write-back instruction to write the page back to disk; and in response to detection of the page fault associated with the virtual address for the page in the secure enclave, unblock creation of further translations of the virtual address.

8. The system of claim 7, wherein, to block creation of the translations of the virtual address, the execution unit is further to execute the plurality of decoded instructions to:

mark the page as not present in a plurality of translation page tables;

detect passage of a period of time during which the page is not accessed; and set a bit in the enclave page cache map for the page mapped to the virtual address, to block creation of further translations of the virtual address for access to the page.

9. The system of claim 8, wherein, to unblock the creation of translations of the virtual address, the execution unit is to execute a decoded unblock instruction to:

clear the bit in the enclave page cache map for the page mapped to the virtual address; and mark the page as present in the plurality of translation page tables.

10. The system of claim 7, wherein to unblock the creation of translations of the virtual address, the execution unit is to execute a decoded unblock instruction to:

verify there is no resource conflict associated with access to the page in the secure enclave;

read, from a first input register, the virtual address for the page in the secure enclave;

translate the virtual address to a guest physical address and the guest physical address to a host physical address; and verify, via an access to the enclave page cache map, that the host physical address of the page is associated with the secure enclave in the system memory.

11. The system of claim 10, wherein the execution unit is further to execute the decoded unlock instruction to:
- determine a host physical address of a secure enclave control structure (SECS) associated with the secure enclave via reference to an entry in the enclave page cache map for the page;
- access, using the host physical address of the SECS, an epoch tracking structure for the secure enclave;
- read, from the epoch tracking structure, a previous epoch value and a previous epoch counter value into a set of local epoch registers;
- verify, based on the previous epoch value and the previous epoch counter value, that the one or more hardware threads have exited the secure enclave; and
- clear the previous epoch value associated with the secure enclave.

12. The system of claim 11, wherein clearance of the previous epoch value associated with the secure enclave is performed before clearance of a blocked bit in the enclave page cache map for the virtual address.

13. A method comprising:
- storing, in a secure enclave of a system memory of a computing system, secure data comprising a page having a virtual address;
- storing, in a secure storage structure of a secure enclave circuit of the computing system, an enclave page cache map to track contents of the secure enclave within the system memory; and
- in response to a request to evict the page from the secure enclave:
  - blocking creation of translations of the virtual address;
  - recording one or more hardware threads currently accessing the secure data in the secure enclave;
  - sending an inter-processor interrupt to one or more cores associated with the one or more hardware threads, to cause the one or more hardware threads to exit the secure enclave and to flush translation lookaside buffers of the one or more cores;
  - detecting a page fault associated with the page before execution of a write-back instruction to write the page back to disk; and
  - in response to detecting the page fault associated with the virtual address for the page in the secure enclave, unblocking creation of translations of the virtual address.

14. The method of claim 13, wherein blocking the creation of translations of the virtual address comprises:
- marking the page as not present in a plurality of translation page tables;
- detecting passage of a period of time during which the page is not accessed; and
- setting a bit in the enclave page cache map for the page mapped to the virtual address, to block creation of translations of the virtual address for access to the page.

15. The method of claim 14, wherein unblocking the creation of translations of the virtual address comprises:
- clearing the bit in the enclave page cache map for the page mapped to the virtual address; and
- marking the page as present in the plurality of translation page tables.

16. The method of claim 13, wherein unblocking the creation of translations of the virtual address comprises:
- verifying there is no resource conflict associated with access to the page in the secure enclave;
- reading, from a first input register, the virtual address for the page in the secure enclave;
- translating the virtual address to a guest physical address and the guest physical address to a host physical address; and
- verifying, via an access to the enclave page cache map, that the host physical address of the page is associated with the secure enclave in the system memory.

17. The method of claim 16, further comprising:
- determining a host physical address of a secure enclave control structure (SECS) associated with the secure enclave via reference to an entry in the enclave page cache map for the page;
- accessing, using the host physical address of the SECS, an epoch tracking structure for the secure enclave;
- reading, from the epoch tracking structure, a previous epoch value and a previous epoch counter value into a set of local epoch registers;
- verifying, based on the previous epoch value and the previous epoch counter value, that the one or more hardware threads have exited the secure enclave; and
- clearing the previous epoch value associated with the secure enclave before clearance of a blocked bit in the enclave page cache map for the virtual address.

* * * * *